United States Patent
Kim et al.

(10) Patent No.: US 9,582,188 B2
(45) Date of Patent: Feb. 28, 2017

(54) METHOD FOR ADJUSTING DISPLAY AREA AND ELECTRONIC DEVICE THEREOF

(71) Applicant: Samsung Electronics Co., Ltd., Suwon-si, Gyeonggi-do (KR)

(72) Inventors: Geon-Soo Kim, Suwon-si (KR); Doo-Suk Kang, Suwon-si (KR); Soo-Ji Hwang, Suwon-si (KR); Yong-Joon Jeon, Hwaseong-si (KR); Jee-Hye Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 14/246,411

(22) Filed: Apr. 7, 2014

(65) Prior Publication Data
US 2014/0306905 A1  Oct. 16, 2014

(30) Foreign Application Priority Data

Apr. 16, 2013  (KR) .................. 10-2013-0041823

(51) Int. Cl.
*G06F 3/0488* (2013.01)
*G06F 3/041* (2006.01)

(52) U.S. Cl.
CPC ........ *G06F 3/04886* (2013.01); *G06F 3/0416* (2013.01); *G06F 2203/04803* (2013.01)

(58) Field of Classification Search
CPC .. G06F 3/04883; G06F 3/0484; G06F 3/0485; G06F 3/044; G06F 3/04817; G06F 3/0416; G06F 3/04886

USPC ................................................. 347/173, 174
See application file for complete search history.

(56) References Cited

U.S. PATENT DOCUMENTS

| | | | |
|---|---|---|---|
| 8,390,597 B2* | 3/2013 | Bernstein | G06F 3/0416 178/18.06 |
| 8,788,964 B2* | 7/2014 | Shin | G06F 3/04817 715/784 |
| 8,994,674 B2* | 3/2015 | Eguchi | G06F 3/04883 345/173 |
| 2011/0063491 A1 | 3/2011 | Kim et al. | |
| 2011/0069021 A1 | 3/2011 | Hill | |
| 2011/0316807 A1 | 12/2011 | Corrion | |
| 2012/0026135 A1 | 2/2012 | Alberth et al. | |
| 2012/0038571 A1* | 2/2012 | Susani | G06F 3/0416 345/173 |
| 2012/0256849 A1 | 10/2012 | Crumly | |
| 2012/0287076 A1 | 11/2012 | Dao et al. | |
| 2012/0293436 A1* | 11/2012 | Dolenc | G06F 3/0485 345/173 |
| 2013/0076688 A1* | 3/2013 | Tokutake | G06F 3/044 345/174 |
| 2013/0147731 A1* | 6/2013 | Adachi | G06F 3/0484 345/173 |
| 2015/0084877 A1* | 3/2015 | Wang | G06F 3/04883 345/173 |

* cited by examiner

*Primary Examiner* — Fred Tzeng
(74) *Attorney, Agent, or Firm* — Jefferson IP Law, LLP

(57) ABSTRACT

A method for adjusting a display area and an electronic device are provided. The method may include, detecting a gesture for setting an inactive area in an active area of a display, identifying a size and a location of an inactive area to set, and designating part of the active area as the inactive area based on the identified size and location of the virtual inactive area.

17 Claims, 16 Drawing Sheets

US 9,582,188 B2

METHOD FOR ADJUSTING DISPLAY AREA AND ELECTRONIC DEVICE THEREOF

CROSS-REFERENCE TO RELATED APPLICATION(S)

This application claims the benefit under 35 U.S.C. §119 (a) of a Korean patent application filed on Apr. 16, 2013 in the Korean Intellectual Property Office and assigned Serial number 10-2013-0041823, the entire disclosure of which is hereby incorporated by reference.

TECHNICAL FIELD

The present disclosure relates to a method and an apparatus for display of an electronic device.

BACKGROUND

Based on rapid development of electronic devices, an electronic device allowing wireless voice communication and information exchange becomes convenient. In the early supply of the electronic device, the electronic device is a portable terminal allowing wireless communication. As electronic device technologies advance and wireless Internet is adopted, applications of the electronic device include a simple phone call, schedule management, a game, remote control using short-range communication, and image capturing using an embedded digital camera, to thus satisfy user's needs.

As the electronic device provides a multimedia service, information to process and to display multimedia also increases. Accordingly, an electronic device including a touch screen for expanding a display size by enhancing spatial utilization is drawing more attention.

The touch screen is an input and display device for inputting and displaying information on a single screen. Hence, by use of the touch screen, the electronic device can increase the display area by removing a separate input device such as keypad. For example, an electronic device that uses the entire screen as the touch screen, the front side of the electronic device can be used as the screen to thereby increase the screen size.

The display of the electronic device is divided into an active area for displaying an actual image, and an inactive area excluding the active area.

The active area can display status information of the electronic device, and detect a user's gesture (touch input). The inactive area is a boundary between a frame of the electronic device and the active area and is generally used to process wiring of the touch panel.

Recent electronic devices reduce the inactive area of the display to increase the active area.

The inactive area of the display can be referred to as a bezel. As the bezel reduces, the user can obtain a wider display area. However, when the user grabs the display, the active area may be covered by the user's hand.

In the electronic device with the small inactive area, the finger that is placed in the active area when the user's grips the device may be recognized as an unnecessary touch.

FIGS. 1A and 1B are diagrams illustrating the unnecessary touch input in an electronic device according to the related art.

Referring to FIGS. 1A and 1B, the electronic device supports a multi-screen function for displaying a plurality of application execution screens and concurrently displays a video play screen and a messaging screen as shown in FIG. 1A.

The area displaying the video play screen and the messaging screen is the active area, and the user can hold the electronic device as shown in FIG. 1B.

Typically, the user holds the electronic device by closely contacting a side of the electronic device with the user's palm and securing the inactive area with a thumb to prevent the fingers from touching the active area.

However, when the user grips the recent electronic device including the inactive area, the user's finger is placed in the active area as shown in FIG. 1B.

In this case, data corresponding to the user's finger is inadvertently selected to thus input of unnecessary data. In FIGS. 1A and 1B, a video file "2012 12 . . . " is selected by the user's finger holding the electronic device.

Such a shortcoming is not present only in the multi-screen function, but can also be found in the single application execution screen.

To address the shortcoming, a method and an apparatus for dynamically adjusting the inactive area according to the user's grip are desired.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for dynamically adjusting an inactive area of a display in an electronic device.

Another aspect of the present disclosure is to provide an apparatus and a method for designating part of an active area as an inactive area according to a user's grip of the electronic device.

Yet another aspect of the present disclosure is to provide a method and an apparatus for editing at least one of a size, a copy, and a move of an inactive area in an electronic device. The inactive area may be a virtual inactive area.

A further aspect of the present disclosure is to provide a method and an apparatus for setting a menu to control a display screen in an inactive area in an electronic device.

A further aspect of the present disclosure is to provide a method and an apparatus for controlling a display screen by adjusting an inactive area in an electronic device.

In accordance with an aspect of the present disclosure, a method for adjusting a display area in an electronic device is provided. The method includes detecting a gesture for setting an inactive area in an active area of a display, identifying a size and a location of the inactive area to set, and designating part of the active area as the inactive area based on the identified size and location of the virtual inactive area.

In accordance with another aspect of the present disclosure, an electronic device for adjusting a display area is provided. The electronic device includes at least one processor, a memory, and at least one program stored in the memory and configured for execution by the at least one processor. The program includes an instruction for, when touch input maintained in an active area of a display is detected, designating part of the active area as the inactive area if the part of the active area satisfies a condition.

In accordance with yet another aspect of the present disclosure, a computer-readable storage medium stores one or more programs for, detecting a gesture for setting an inactive area in an active area of a display, identifying a size and a location of the inactive area to set, and designating part of the active area as the inactive area based on the identified size and location of the inactive area.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1A:
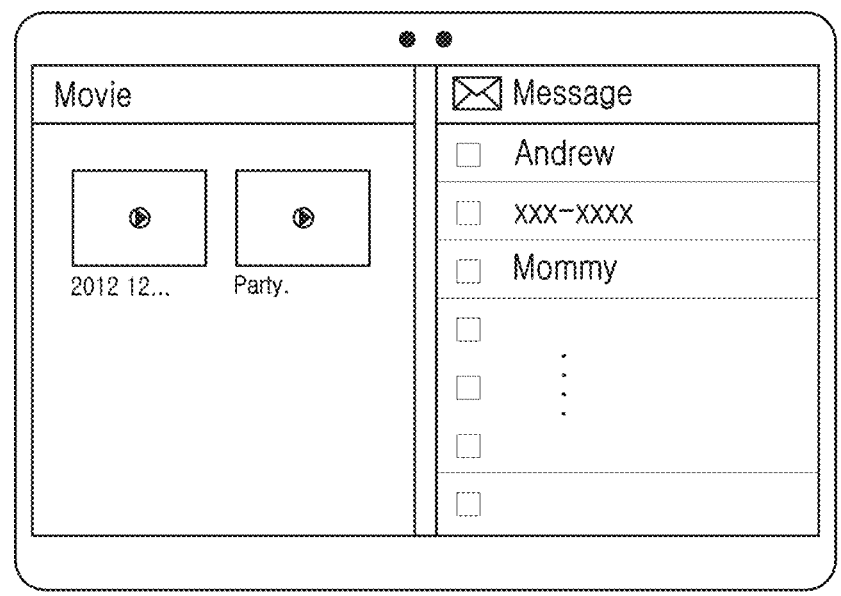
FIGS. 1A and 1B illustrate an unnecessary touch input in an electronic device according to the related art.
Figure 1B:
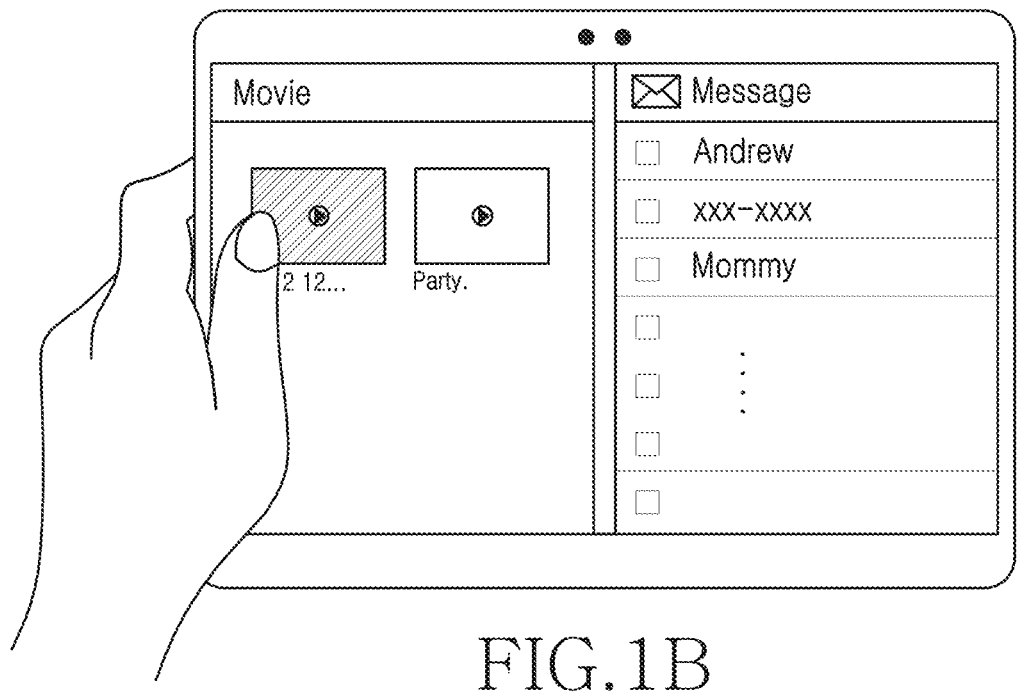

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure relates to a method and an apparatus for designating part of an active area of a display area as an inactive area.

Various embodiments of the present disclosure provide a method and an apparatus for dynamically defining an inactive area of a display according to a user's grip in an electronic device. Herein, the dynamic setting of the inactive area can use part of an active area of the display as the inactive area.

The display of the electronic device is divided into the active area for actual display, and the inactive area excluding the active area. The active area can display status information of the electronic device and detect a user's gesture (touch input). The inactive area is configured to be the area between a frame of the electronic device and the active area. The inactive area can be referred to as a bezel. The dynamic setting of the inactive area can signify that a virtual bezel is generated.

Herein, the gesture indicates a touch or a touch pattern on a touch screen of the electronic device. An external input such as user's finger or stylus pen applies the touch to the touch screen of the electronic device, and the gesture can include touch-and-drag in a certain pattern on the touch screen. In some cases, the gesture can include the touch-and-drag and touch release.

The electronic device can be configured as a portable electronic device such as a portable terminal, a mobile phone, a media player, a tablet computer, a handheld computer, or a Personal Digital Assistant (PDA). The electronic device may be a portable electronic device combining two or more functions of those devices.

Figure 2:
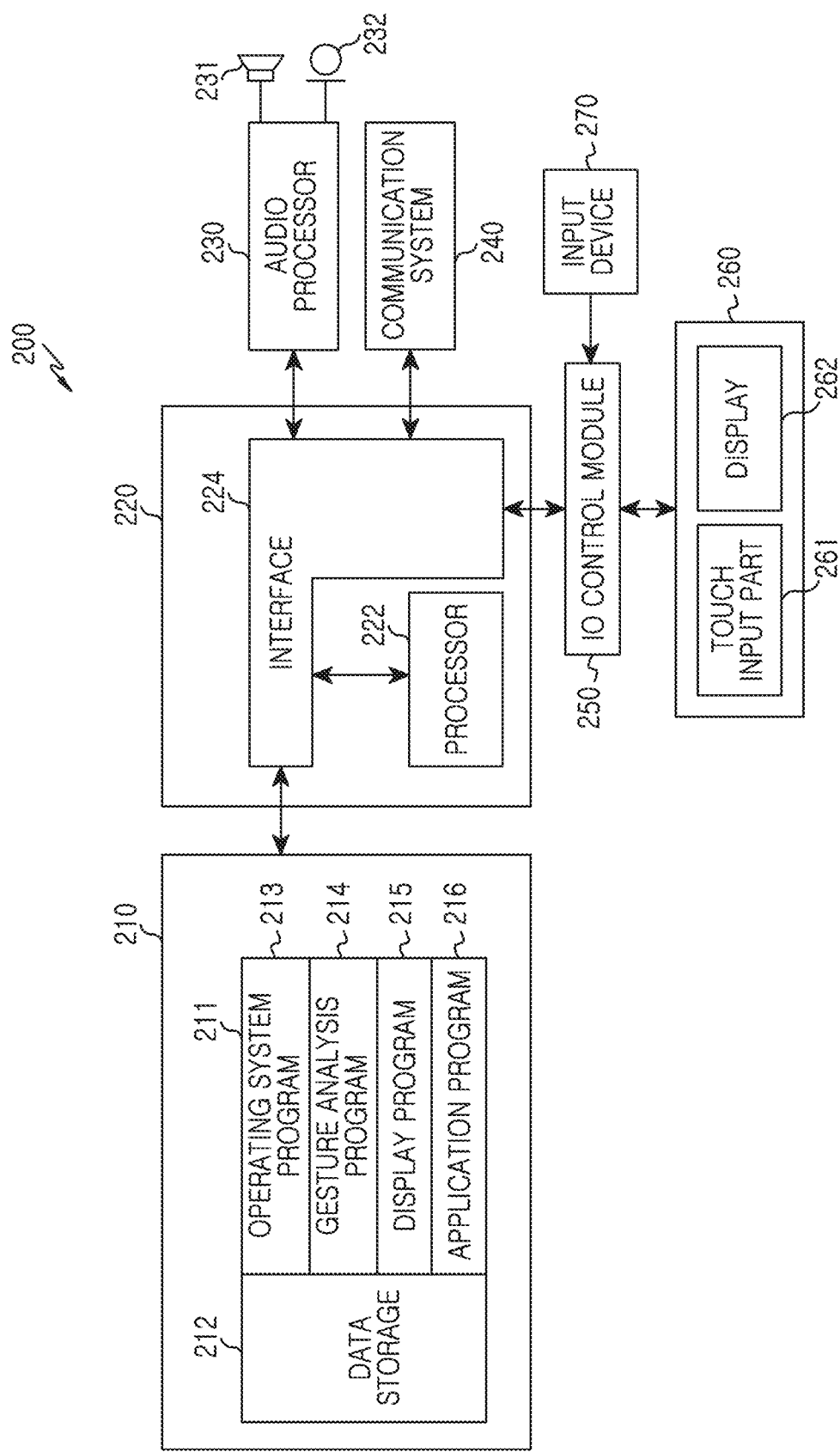
FIG. 2 is a block diagram of an electronic device for dynamically setting an inactive area of a display according to an embodiment of the present disclosure.

FIG. 2 is a block diagram of an electronic device for dynamically setting an inactive area of a display according to an embodiment of the present disclosure.

Referring to FIG. 2, the electronic device 200 includes a memory 210, a processor unit 220, an audio processor 230, a communication system 240, an Input/Output (TO) controller 250, a touch screen 260, and an input device 270. Herein, the electronic device 200 can include a plurality of memories 210 and a plurality of communication systems 240.

The components of the electronic device 200 are described below in more detail.

The memory 210 includes a program storage region 211 for storing a program to control operations of the electronic device 200 and a data storage region 212 for storing data generating in program execution. For example, the data storage region 212 can store updatable data such as a phonebook, an outgoing message, and an incoming message. The data storage region 212 can store area information such as a gesture detection area that is available as the inactive area in the active area.

The data storage region 212 can store control menu information of the virtual inactive area. The control menu can control a displayed execution screen. As will be described below, the control menus are at least one command that controls the operation of the electronic device. For example, the control menu can include play, move, and stop commands in the execution screen of a multimedia presentation application. In another example, the control menu can include a back and forward command in a web browser application.

The program storage region 211 includes an operating system program 213, a gesture analysis program 214, a display program 215, and at least one application program 216. Herein, the program in the program storage region 211 may be referred to as an instruction set, which is a set of instructions that are executable by the processor unit 220 to perform specific tasks. The programs in the program storage region 211 may be configured as hardware components.

The operating system program 213 includes various software components for controlling general system operations. These include, e.g., a memory management and control module, a storage hardware (device) control and management module, and a power control and management module. The operating system program 213 may process normal communication between various hardware devices and software components (modules).

The gesture analysis program 214 analyzes the user's gesture for controlling the electronic device 200. Herein, the analysis of the user gesture indicates that the user's gesture is detected.

For example, the gesture analysis program 214 can analyze a gesture for setting the virtual inactive area and a user's gesture for releasing the preset inactive area.

The gesture analysis program 214 can determine the gesture for setting the virtual inactive area by detecting a long touch input during a certain time in the active area, a touch input moved to a certain area of the active area, a menu input for generating the inactive area, and an input for changing the displayed screen configuration. In addition, when the user grips the electronic device, the gesture analysis program 214 can determine the gesture for setting the virtual inactive area.

The gesture analysis program 214 can analyze the user's gesture for editing the virtual inactive area.

Herein, the gesture analysis program 214 can analyze the user's gesture for moving the virtual inactive area to a different location.

The gesture analysis program 214 can analyze the user's gesture for adjusting a size of the virtual inactive area.

The gesture analysis program 214 can analyze the user's gesture for copying the inactive area having the same characteristics as the virtual inactive area, to a different location.

The gesture analysis program 214 can analyze the gesture for selecting the control menu in the virtual inactive area.

The gesture analysis program 214 can forward the analyzed user gesture to the display program 215.

The display program 215 can include various software components for providing and displaying graphics on the touch screen 260. The term 'graphics' can include text, a webpage, an icon, a digital image, a video, and an animation.

The display program 215 can include various software components that form a user interface.

That is, when a user's request for setting the inactive area is detected, the display program 215 can designate and display a certain active area based on the location of the detected user's gesture of setting the inactive area.

When a user's request for editing the inactive area is detected, the display program 215 can display the editing interface such as size adjustment, location movement, and copy of the preset inactive area according to the user's gesture.

The display program 215 can display the inactive area with the control menu, which is for the execution screen, and then display a screen corresponding to the control menu by detecting the user's gesture.

When a user request for releasing the inactive area is detected, the display program 215 can change the preset inactive area to the active area.

The display program 215 is configured to display the execution screen in accordance with the active area according to the inactive area setting, the inactive area release, and the inactive area editing.

When the preset inactive area rotates according to rotation of the electronic device, the display program 215 can change the rotated inactive area to the original location.

The application program 216 includes a software component for at least one application program installed in the electronic device 200.

The processor unit 220 includes at least one processor 222 and an interface 224. Herein, the processor 222 and the interface 224 can be integrated onto at least one integrated circuit or may be separate components.

The interface 224 functions as the memory interface for controlling access of the processor 222 and the memory 210.

The interface 224 may also function as a peripheral interface for controlling connection between an IO peripheral of the electronic device 200 and the processor 222.

The processor 222 may control the electronic device 200 to dynamically set the inactive area using at least one software program. In so doing, the processor 220 may execute at least one program stored in the memory 210 to provide the function corresponding to the program. For example, the processor 222 can include a display processor for analyzing the user's gesture, defining part of the active area as the inactive area, and displaying the active area as the inactive area according to the user's gesture. That is, the inactive area setting function of the electronic device 200 can be provided using the software such as program stored in the memory 210 or the hardware such as a display processor.

The audio processor 230 provides an audio interface between the user and the electronic device 200 via a speaker 231 and a microphone 232.

The communication system 240 may perform a communication function for voice communication and data communication of the electronic device 200. The communication system 240 may be divided into a plurality of communication submodules for supporting different communication networks. For example, the communication networks can include, but not limited to, a Global System for Mobile communication (GSM) network, an Enhanced Data GSM Environment (EDGE) network, a Code Division Multiple Access (CDMA) network, a Wideband-CDMA (WCDMA) network, a Long Term Evolution (LTE) network, an Orthogonal Frequency Division Multiple Access (OFDMA) network, a wireless Local Area Network (LAN), a Bluetooth network, and Near Field Communication (NFC).

The IO controller 250 can provide an interface between the IO device such as touch screen 260 and input device 270, and the interface 224.

The touch screen 260, which is an IO device for outputting and inputting information, can include a touch input part 261 and a display 262.

The touch input part 261 can provide touch information detected through a touch panel to the processor unit 220 via the IO controller 250. In so doing, the touch input part 261 can convert the touch information to an instruction such as touch_down, touch_move, and touch_up and provide the instruction to the processor unit 220. The touch input part 261 can provide the user's gesture of defining an inactive area, releasing the inactive area, and editing the inactive area.

The display 262 can display the status information of the electronic device 200, a character input by the user, a moving picture, and a still picture. For example, the display 262 can display the process for defining, releasing, and editing the inactive area. Herein, the inactive area can be defined using part of the active area.

The input device 270 can provide input data generated by the user's selection to the processor unit 220 through the TO controller 250. For example, the input device 270 can include only a control button to control the electronic device 200. For example, the input device 270 can include a keypad for receiving the input data from the user. The input device 270 can issue input data requesting to set, release, and edit the inactive area.

The electronic device 200 can further include elements (not shown) for providing additional functions, such as a camera module for capturing the image or the video, a broadcasting receiver module for receiving the broadcasts, a digital music player module such as an MP3 module, a close-range wireless communication module for close-range wireless communication, and a proximity sensor module for sensing proximity, and respective software modules for interacting with such modules.

The electronic device for adjusting the display area can include at least one processor, a memory, and at least one program stored in the memory and configured for execution by the at least one processor. The program can include an instruction for, when a touch input is detected in an active area of a display, processing to designate part of the active area based on a condition as the virtual inactive area. For example, the gesture can include at least one of touch movement of a certain distance from a display boundary, menu selection to generate a virtual bezel, and menu selection to change screen configuration.

The program can include an instruction for, when detecting a gesture for requesting to release the inactive area, restoring a preset inactive area to the active area.

The program can include an instruction for, when a plurality of execution screens is displayed and a gesture is detected, determining the size and the location of the virtual inactive area in a display area of the detected gesture among split display areas.

The program can include an instruction for, when detecting a gesture during application execution requiring to maintain an aspect ratio, determining the size and the location of the virtual inactive area according to the required aspect ratio.

The program can include an instruction for setting a control menu of an execution screen in a preset area of the inactive area.

The program can include an instruction for, after setting the inactive area, when detecting a user gesture in the inactive area, blocking input data of the gesture and, when a control menu is set in the inactive area of the detected user gesture, generating input data corresponding to the control menu.

The program can include an instruction editing the set inactive area according to a user gesture. For example, the editing of the inactive area can include at least one of size adjustment, location change, and copy of the inactive area.

The program can include an instruction for adding guide information of the control menu to a control menu area. For example, the guide information can include at least one of icon information, text information, and image information for explaining the set control menu.

The program can include an instruction for, when a location of a preset inactive area is changed according to rotation of the electronic device, changing a location of the change inactive area.

The program can include an instruction identifying a direction of the detected user gesture after the electronic device is rotated and changing the inactive area location to the direction of the detected gesture according to the rotation of the electronic device.

Figure 3:
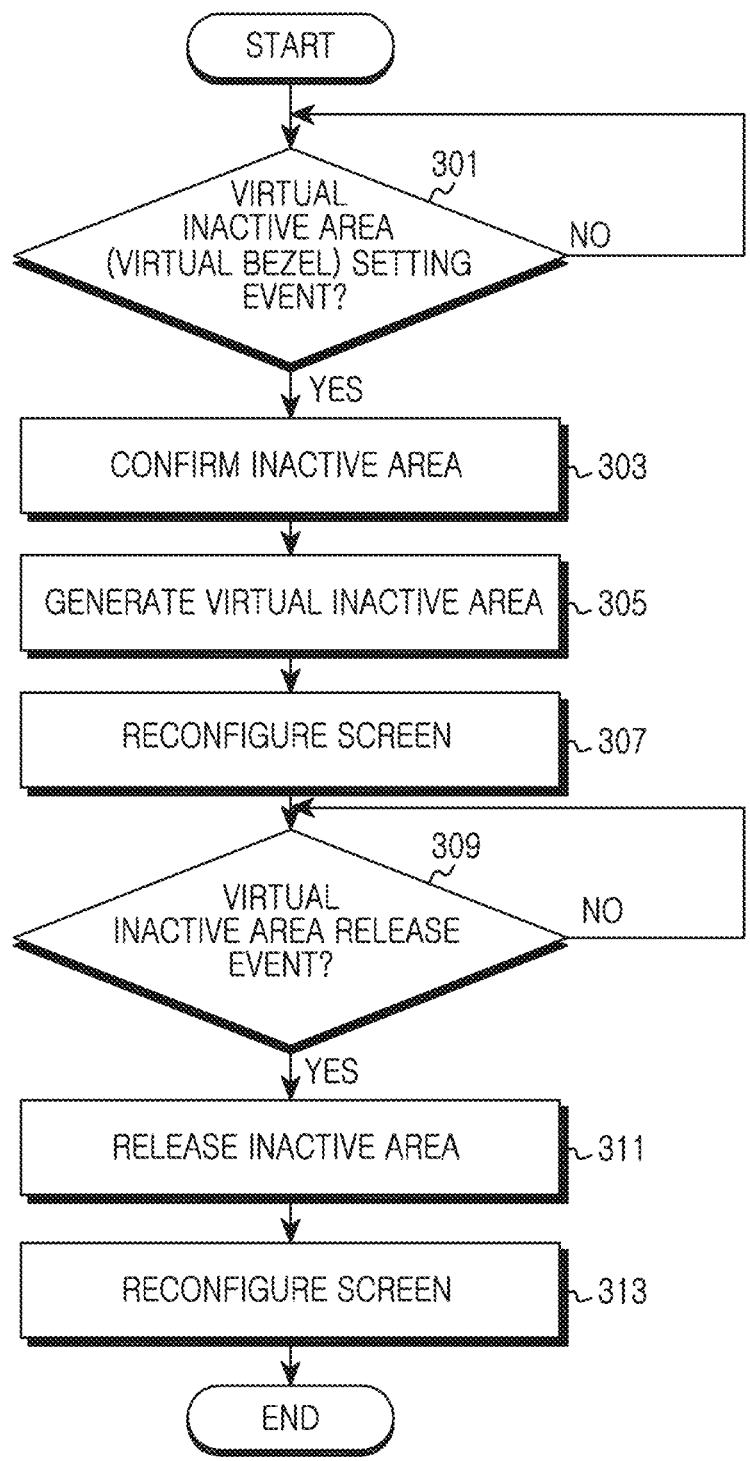
FIG. 3 is a flowchart of a method for setting an inactive area of a display in an electronic device according to an embodiment of the present disclosure.

FIG. 3 is a flowchart of a method for setting the inactive area of the display in the electronic device according to an embodiment of the present disclosure.

Referring to FIG. 3, the electronic device can determine whether an event for setting the virtual inactive area (virtual bezel) occurs in operation 301. Herein, the event for setting the virtual inactive area designates part of the active area of the display as the inactive area.

The electronic device can set the gesture detection area based on the edge of the active area and then set the virtual inactive area by detecting the user's gesture. The gesture detection area can be defined as a preset pixel area based on the edge of the active area in at least one of four sides of the active area. Because the virtual inactive area can be generated on all sides of the active area, it may be advantageous that the gesture detection area is set on all four sides of the active area.

For example, the user's gesture for setting the virtual inactive area can be provided by maintaining a touch input for a certain time in the gesture detection area.

For example, the user's gesture for setting the virtual inactive area can move the touch input from the frame of the display to the boundary (edge) of the gesture detection area. At this time, the user's gesture for setting the virtual inactive area can be divided into a panning gesture for moving the display screen and a scroll gesture.

For example, the user's gesture for setting the virtual inactive area can select a menu (e.g., a displayed software execution menu, a hardware execution menu) for generating the inactive area.

For example, the user's gesture can select a menu for changing the displayed screen configuration. The menu for changing the displayed screen configuration displays a plurality of execution screens together in the active area. In this case, the inactive area is defined because, when the screen configuration is changed, the menu for controlling the execution screen can be placed at the user's finger location.

For example, the user's gesture can be gripping the electronic device, which can cause an unintended gesture in the active area. The electronic device can determine the user's grip using a grip sensor, a touch sensor, and a touch panel.

If no virtual inactive area setting event is detected in operation 301, the electronic device continues to repeat operation 301 until a virtual inactive area setting event is detected.

After detecting the virtual inactive area setting event in operation 301, the electronic device confirms the inactive area in operation 303 and generates the virtual inactive area in operation 305. In operation 303, the electronic device determines a width of the inactive area. The electronic device can determine the width from the edge of the active area to the user's gesture location as the virtual inactive area.

For example, when detecting the user's gesture in the left or right side of the electronic device, the electronic device can generate the virtual inactive area having a constant width along the vertical axis.

For example, when detecting the user's gesture in the top or bottom side of the electronic device, the electronic device can generate the virtual inactive area that has a constant width along the horizontal axis.

In operation 307, the electronic device can reconfigure the screen. Herein, the screen reconfiguration resizes the display screen according to the size of the active area that changed based on the virtual inactive area.

That is, in operation 307, the electronic device displays the execution screen according to the size of the changed active area.

When an application requiring a high resolution is executed, the electronic device can define the inactive area according to the resolution regardless of the narrow inactive area.

In operation 309, the electronic device determines whether a virtual inactive area release event occurs.

The electronic device determines the release event by detecting the release of the touch input in the gesture detection area.

For example, the electronic device can determine the release event by detecting the user's gesture for selecting a menu (a displayed software execution a menu, hardware execution menu) for releasing the virtual inactive area.

For example, the electronic device can determine the release event by detecting the user's gesture for restoring the changed screen configuration.

If no virtual inactive area release event is detected in operation 309, the electronic device repeats operation 309 until a virtual inactive release event is detected.

By contrast, if the virtual inactive area release event is detected in operation 309, the electronic device releases the inactive area in operation 311 and reconfigures the screen according to the changed active area based on the released inactive area in operation 313.

Figure 4:
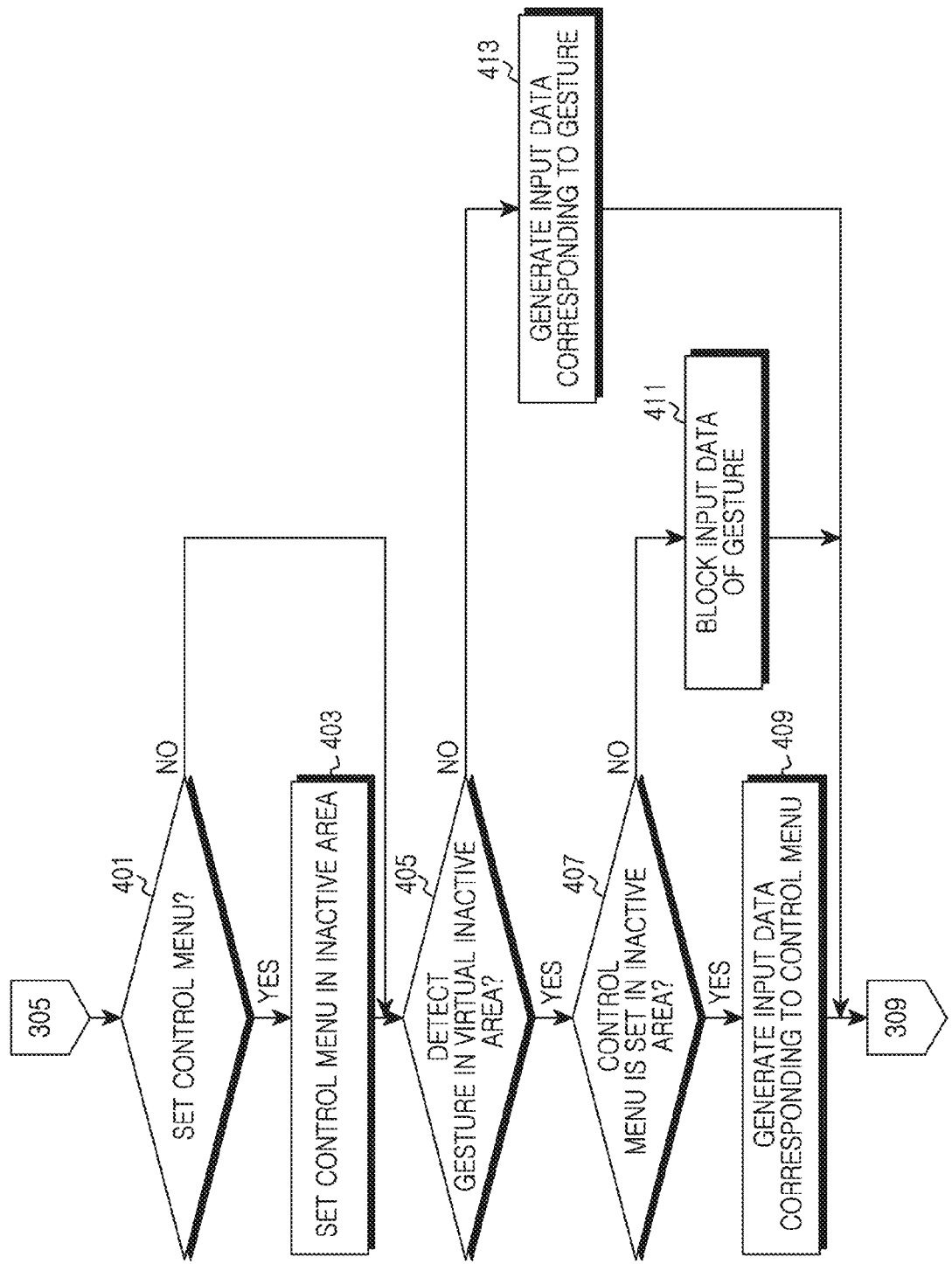
FIG. 4 is a flowchart of a method for setting an inactive area in an electronic device according to an embodiment of the present disclosure.

While the electronic device releases the inactive area by detecting the gesture for releasing the touch input in the gesture detection area in operation 309, the electronic device may not release the inactive area even when the gesture for releasing the touch input is detected to control the display screen with the inactive area, which shall be described by referring to FIG. 4.

FIG. 4 is a flowchart of a method for setting the inactive area in the electronic device according to an embodiment of the present disclosure.

Referring to FIG. 4, the electronic device can designate part of the active area as the inactive area by detecting the user's gesture in operation 305 of FIG. 3.

Next, the electronic device determines whether it is possible to set the control menu in the inactive area in operation 401. Herein, the control menu controls the display screen and may control a screen for a browser application that includes a forward command and a back command.

The control menu can include play, move, and stop commands in the execution screen of a video play application.

Such a control menu can be displayed in the inactive area according to the type of the execution screen that is being displayed when the inactive area is set.

Upon determining that the control menu can be set in operation 401, the electronic device can set the control menu and display the control menu in the inactive area in operation 403.

In so doing, the electronic device can defines an area for the control menu according to the location of the detected user's gesture in the inactive area and displays the control menu in the defined area.

For example, the electronic device can display the control menu outside the location of the detected user's gesture in the virtual inactive area.

In so doing, the electronic device can display the control menu proximate to the location of the detected user's gesture. This can signify that the movement range (a vertical area based on the location of the detected gesture, a horizontal area based on the location of the detected gesture) of the user's finger gripping the electronic device in an unintended situation is confined in the inactive area.

The electronic device can define the control menu area according to the number of the control menus.

The control menu area is defined based on the number of the control menus. For example, if the electronic device detects the user's gesture above the inactive area and sets two control menus below the inactive area, the electronic device can define the bottom of the inactive area as the control menu area based on the number of the control menus, and display the control menu in each area. That is, when the bottom of the inactive area includes 800 pixels and two menus are displayed, the bottom area is divided into two areas and the control menus are set in the respective areas (one area includes 400 pixels). When the bottom of the inactive area includes 800 pixels and four control menus are displayed, the bottom area is divided into four areas and the control menus are displayed in the respective areas (one area includes 200 pixels).

For example, when detecting the user's gesture below the inactive area, the electronic device can display the control menu above the inactive area.

For example, when detecting the user's gesture in the middle of the inactive area, the electronic device can display the control menu above or below the inactive area.

In this case, the electronic device can display the entire control menu above or below the inactive area when the upper or lower area has an enough space for the control menu.

By contrast, when the area for the control menu is not sufficient, the electronic device can concurrently display the control menu both above and below the inactive area.

That is, when displaying three control menus in the inactive area, the electronic device can selectively display three control menus above and below the inactive area based on the size or display one control menu above the inactive area and the other two control menus below the inactive area.

When setting the control menu in the inactive area or confirming no control menu setting available in the inactive area in operation 401, the electronic device can determine whether the gesture is detected in the virtual inactive area in operation 405.

When not detecting the gesture in the virtual inactive area (when detecting the gesture in the active area) in operation 405, the electronic device issues the input data corresponding to the detected gesture in operation 413.

By contrast, when detecting the gesture in the virtual inactive area in operation 405, the electronic device can determine whether the control menu is set in the inactive area in operation 407.

When no control menu is set in the inactive area of the detected user gesture in operation 407, the electronic device can process to block the input data corresponding to the user's gesture in operation 411. That is, the electronic device processes not to recognize the user's gesture in the inactive area without the control menu.

By contrast, when the control menu is set in the inactive area of the detected user gesture in operation 407, the electronic device can generate input data corresponding to the control menu at the location of the detected gesture in operation 409. That is, the electronic device recognizes the user's gesture in the control menu area displayed in the inactive area.

As such, the electronic device, upon generating the input data, can determine whether the virtual inactive area release event occurs in operation 309 of FIG. 3.

While the electronic device sets and displays the control menu in the virtual inactive area and detects input in the inactive area in FIG. 4, the electronic device, when the displayed screen configuration is changed, can change the control menu based on the changed screen. That is, when the control menu for a first screen is set in the inactive area and the display screen is changed to a second screen, the control menu of the first screen is unnecessary and thus the control menu of the inactive area is automatically switched to the control menu of the second screen.

Figure 5:
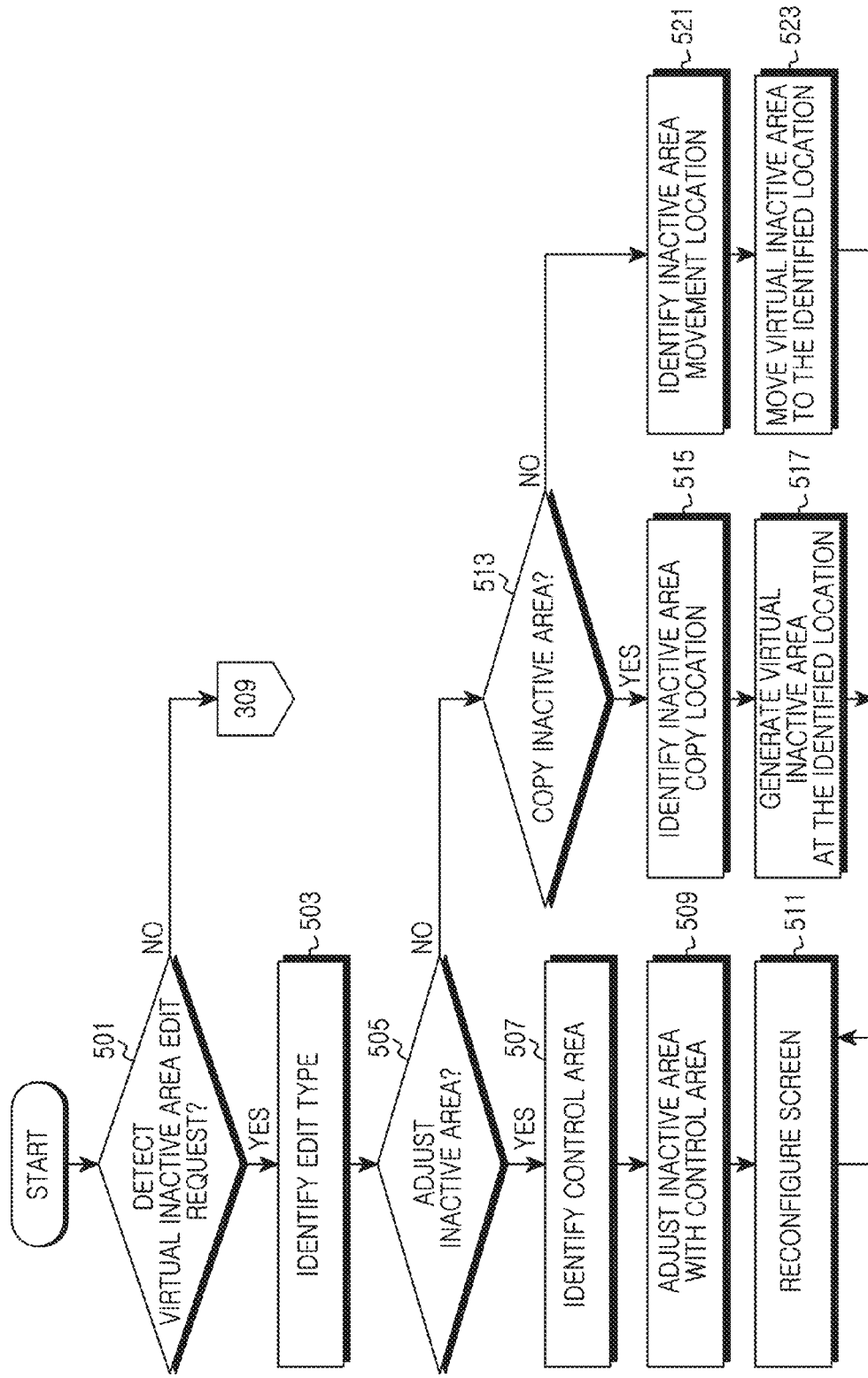
FIG. 5 is a flowchart of a method for editing a virtual inactive area in an electronic device according to an embodiment of the present disclosure.

FIG. 5 is a flowchart of a method for editing the virtual inactive area in the electronic device according to an embodiment of the present disclosure.

Referring to FIG. 5, the electronic device can determine whether a virtual inactive area edit request is detected in operation 501. Herein, the virtual inactive area edit request is a request to change a region of the preset inactive area, and can include adjusting the inactive area size, moving the inactive area, and generating the same inactive area at a different location.

If no edit request is detected in operation 501, the electronic device can determine whether the virtual inactive area release event occurs in operation 309 of FIG. 3.

By contrast, if an edit request is detected in operation 501, the electronic device can confirm the edit type (edit style) requested by the user in operation 503 and determine if the edit type is an adjustment to the inactive area in operation 505.

If the edit type is for adjusting the inactive area size in operation 505, the electronic device can identify a control area in operation 507 and adjust the inactive area and the control area in operation 509. The control area indicates the range for modifying the preset inactive area. The electronic device can identify the control area by detecting the user's gesture. For example, the user can define the control area by moving the touch kept in the inactive area and determine the area adjusted at the location of the touch input release, as the control area.

By contrast, if the edit type is not for adjusting the inactive area size in operation 505, the electronic device can determine if the edit type is a request for copying the inactive area in operation 513.

If the edit type is a request for copying the inactive area in operation 513, the electronic device identifies an inactive area copy location in operation 515 and generates a virtual inactive area at the identified location in operation 517. For example, the user can designate the location of the same inactive area while still touching the inactive area, and designate an inactive area at a different location. In so doing, the same active area can have the same area size as the inactive area.

If the edit type is not for copying the inactive area in operation 513, the electronic device determines the edit type is the movement location of the inactive area in operation 521 and then moves the virtual inactive area to the identified location in operation 523. In so doing, the electronic device can change the location of the inactive area by detecting the user's gesture for moving the touched inactive area to a particular location.

When the inactive area is edited as above, the electronic device can reconstruct the screen based on the edited inactive area in operation 511.

Figure 6A:
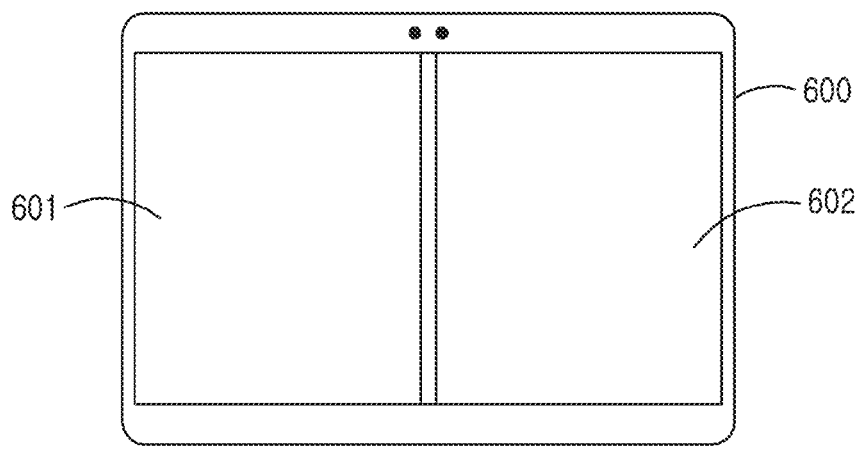
FIGS. 6A, 6B, and 6C are diagrams of a screen for setting a virtual inactive area in an electronic device according to an embodiment of the present disclosure.
Figure 6B:
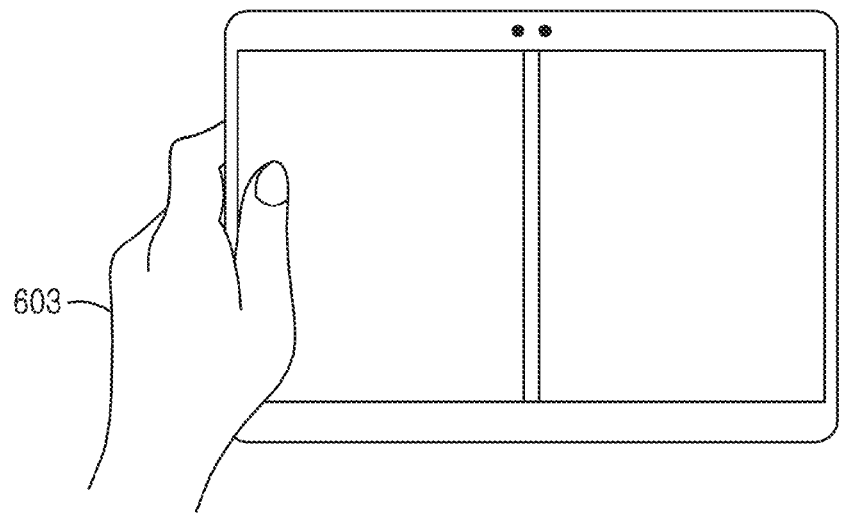
Figure 6C:
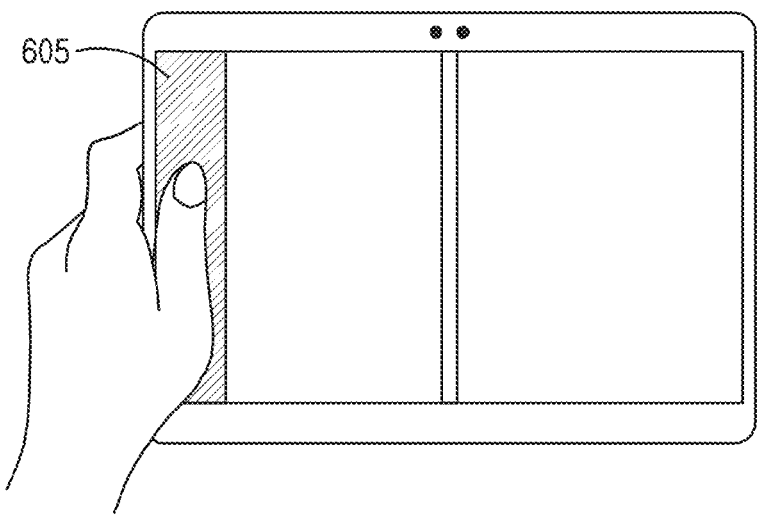

FIGS. 6A, 6B, and 6C are diagrams of a screen for setting the virtual inactive area in the electronic device according to an embodiment of the present disclosure.

Referring to FIG. 6A, the electronic device 600, which supports displaying a plurality of application screens, can display different execution screens on the left 601 and the right 602 based on the center of the display as shown in FIG. 6A. The area of the displayed execution screen is referred to as the active area, and the area outside the active area in the front is referred to as the inactive area. The inactive area may be referred to as the edge of the front surface.

Referring to FIG. 6B, when the user grips the electronic device, part of the finger 603 is placed in the active area. The finger in the active area covers part of the execution screen displayed in the active area so that the user may hold the electronic device.

Since the active area includes an input part (touch panel) for detecting the user's gesture, the finger in the active area causes an unnecessary touch input.

Recently, the electronic device widens the active area by narrowing the inactive area. However, as the inactive area is reduced, it is difficult to grab the electronic device without placing a touch input into the active area.

To address the unnecessary touch input, the electronic device can designate part of active area as the inactive area 605 according to the user's grip as shown in FIG. 6C.

That is, when the user grips the left side (or right side) of the electronic device, the electronic device can generate a virtual vertical inactive area in a constant width based on the location of the detected user's gesture.

For example, when detecting the user's gesture at the top or bottom of the electronic device, the electronic device can generate a virtual horizontal inactive area in a constant width based on the location of the detected user's gesture.

The virtual inactive area setting indicates that the active area is narrowed. Accordingly, the electronic device can display the execution screen according to the changed active area.

When displaying a plurality of execution screens, the electronic device can split the changed active area for the execution screens and then display the execution screens in their respective active areas.

Figure 7A:
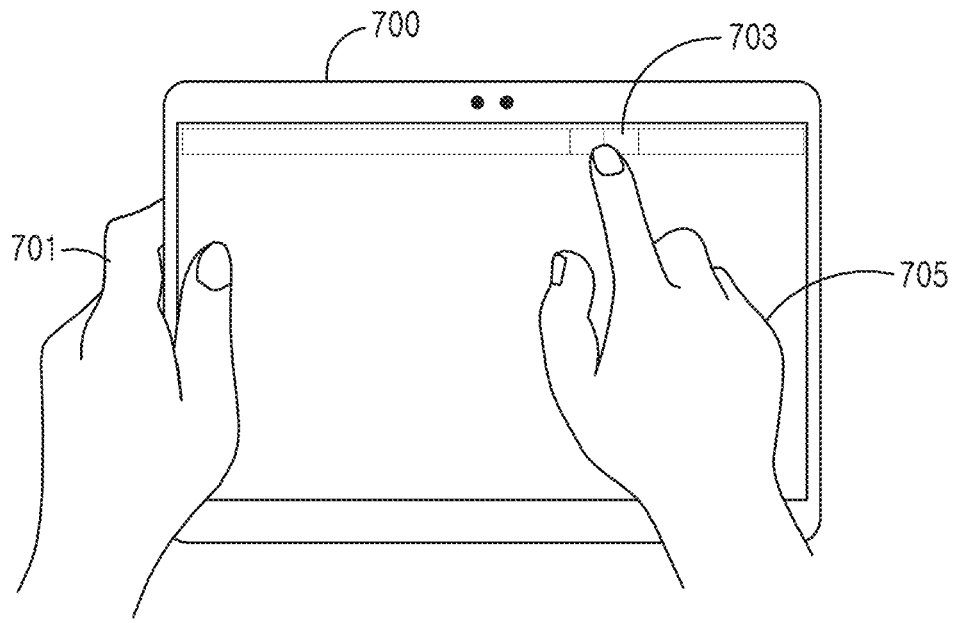
FIGS. 7A and 7B are diagrams of a screen for setting a virtual inactive area in an electronic device according to an embodiment of the present disclosure.
Figure 7B:
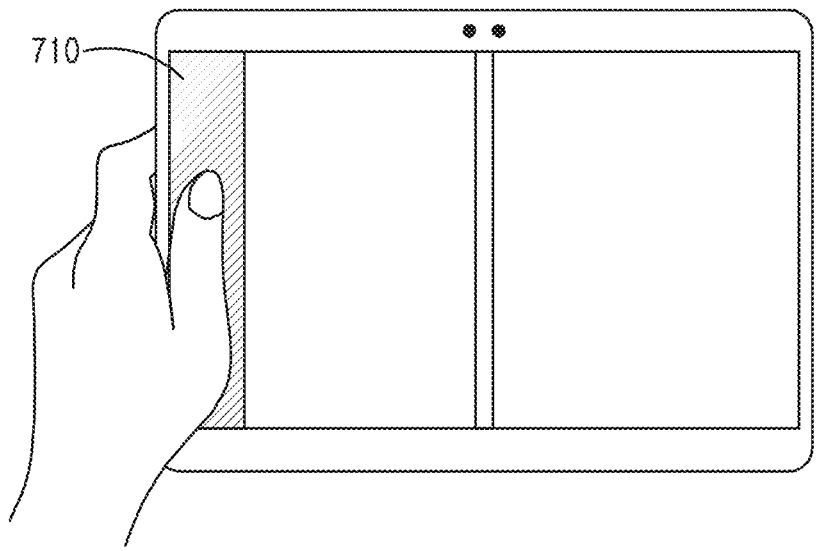

FIGS. 7A and 7B are diagrams of a screen for setting the virtual inactive area in the electronic device according to an embodiment of the present disclosure.

Referring to FIG. 7A, the electronic device 700, which supports displaying a plurality of application screens, can display a menu 703 for the multi-screen function. When detecting the user's gesture for selecting the menu 703 while the user's body 701 grips the electronic device 700, the electronic device 700 can display a plurality of execution screens by splitting the single active area.

While detecting the user's gesture for selecting the menu 703, the electronic device can designate part of active area as the inactive area and display the execution screens in the remaining active areas.

In so doing, when the user grips the active area and a gesture 705 for selecting the menu 703 is detected, the electronic device can set the inactive area 710 based on the active area held by the user as shown in FIG. 7B. Notably, the electronic device may detect the gesture for selecting the menu and then define the inactive area based on the active area grabbed by the user.

Figure 8A:
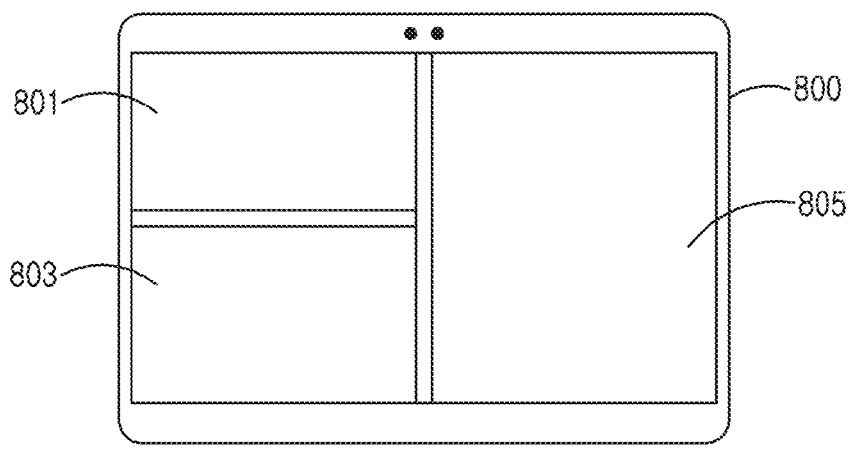
FIGS. 8A, 8B, and 8C are diagrams of a screen for setting a virtual inactive area in an electronic device according to another embodiment of the present disclosure.
Figure 8B:
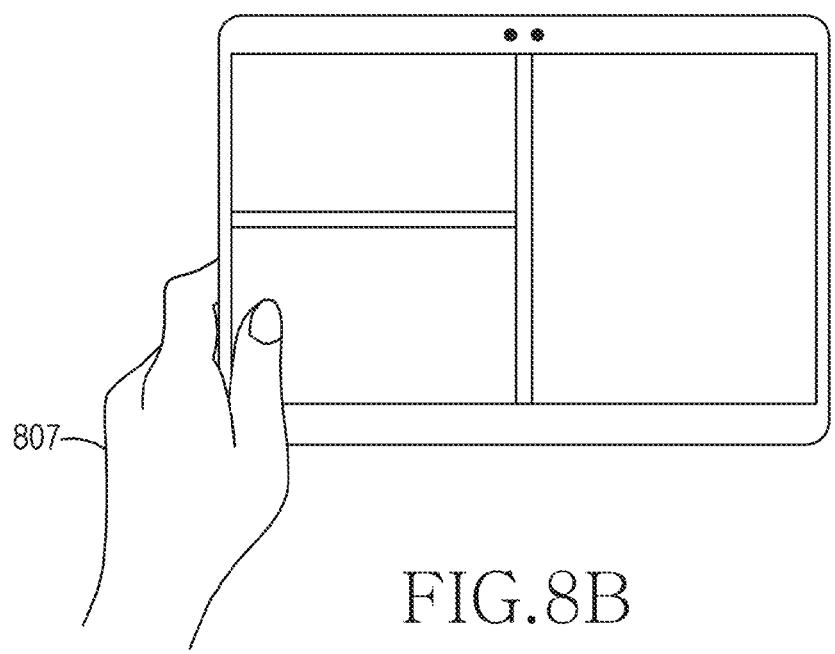
Figure 8C:
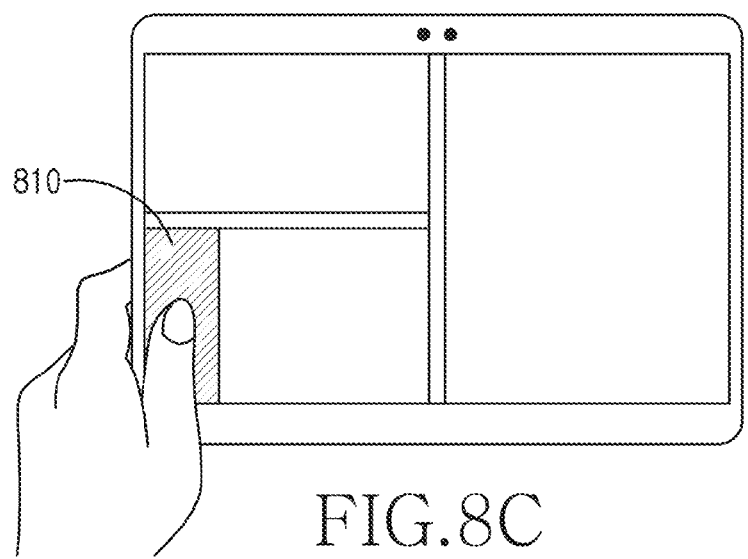

FIGS. 8A, 8B, and 8C are diagrams of a screen for setting the virtual inactive area in the electronic device according to another embodiment of the present disclosure.

Referring to FIG. 8A, the electronic device, which supports displaying a plurality of application screens, can concurrently display three execution screens. In so doing, the electronic device 800 can display different execution screens along the horizontal or vertical axis. That is, the electronic device 800 can display the execution screens on the left top 801, the left bottom 803, and the right 805 based on the center of the active area as shown in FIG. 8A.

Referring to FIG. 8B, according to the user's grip, the electronic device can designate part of the active area as the inactive area. That is, when the user's body 807 grips the left edge of the active area, the electronic device can define the vertical inactive area based on the grip location.

In this case, while the electronic device can concurrently define the inactive area in the left top and bottom active areas, the electronic device can set the inactive area only in the execution location where the user's finger is placed.

That is, when the user grips the left-bottom active area as shown in FIG. 8B, the electronic device can designate part of the left-bottom active area as the inactive area 810 as shown in FIG. 8C.

Figure 9A:
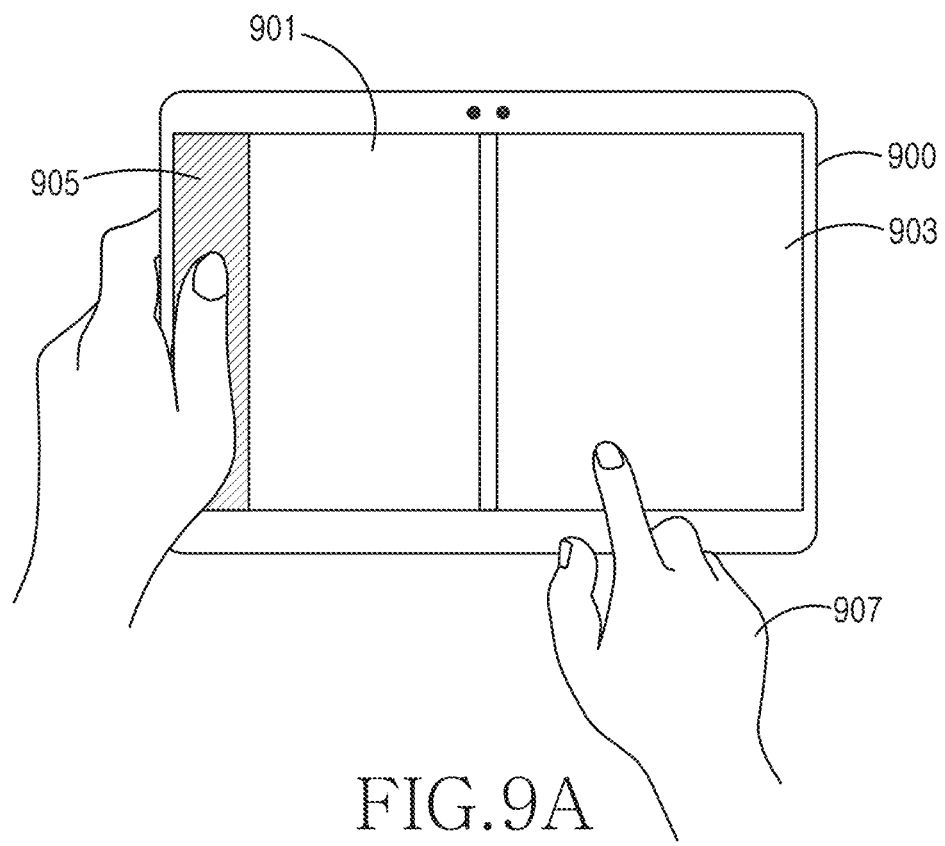
FIGS. 9A and 9B are diagrams of an inactive area edited in an electronic device according to an embodiment of the present disclosure.
Figure 9B:
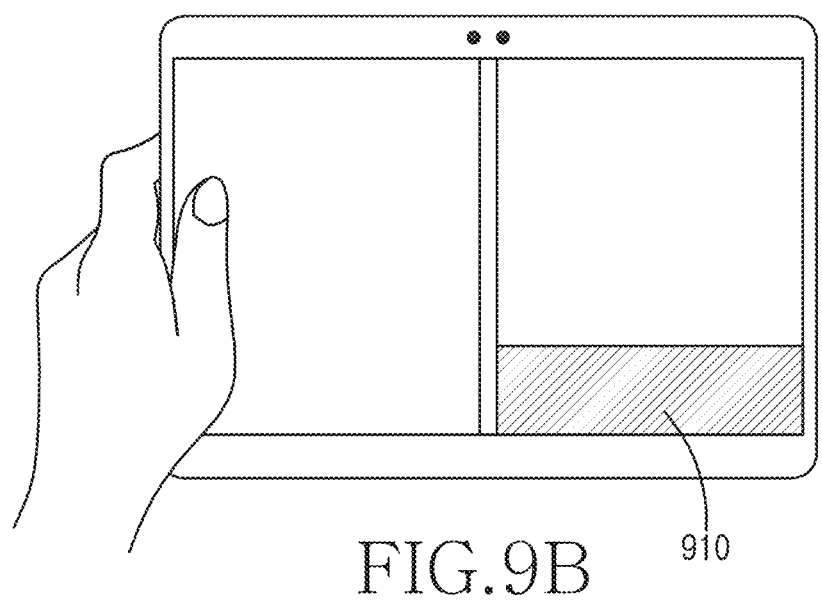

FIGS. 9A and 9B are diagrams of the inactive area edited in the electronic device according to an embodiment of the present disclosure.

Referring to FIGS. 9A and 9B, the electronic device can designate part of the active area as the inactive area according to the user's grip.

Further, the electronic device can edit the inactive area by moving the inactive area to a different location.

The electronic device 900 can designate part of the active area as the inactive area by detecting the user's gesture in the active area. Such an inactive area is maintained until the releasing of the inactive area occurs. Herein, the releasing of the inactive area can release the gesture for setting the inactive area. Herein, the touch input for setting the inactive area can be released.

For example, the electronic device 900 can detect the user's gesture for selecting the menu (displayed software execution menu, hardware execution menu) which releases the inactive area.

For example, the electronic device 900 can detect the user's gesture for restoring the changed screen configuration.

When detecting a user's gesture 907 for selecting a particular location in the left inactive area 905 (for example, when the touch is maintained in the inactive area) as shown in FIG. 9A, the electronic device 900 can move the left inactive area to the location 910 selected by the user as shown in FIG. 9B. At this time, the moved inactive area can maintain the original characteristics to maintain the same width as the original inactive area. When the control menu is set and displayed in the inactive area, the inactive area including the control menu can be moved and maintain the original characteristics.

While the inactive area is edited with the multiple execution screens 901 and 903 displayed in the active area in FIG. 9A, the inactive area can be edited while the active area displays a single execution screen.

Figure 10A:
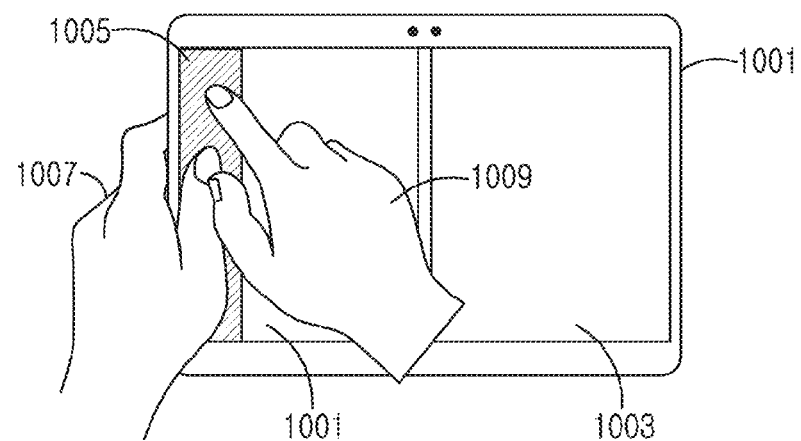
FIGS. 10A, 10B, and 10C are diagrams of an inactive area edited in an electronic device according to another embodiment of the present disclosure.
Figure 10B:
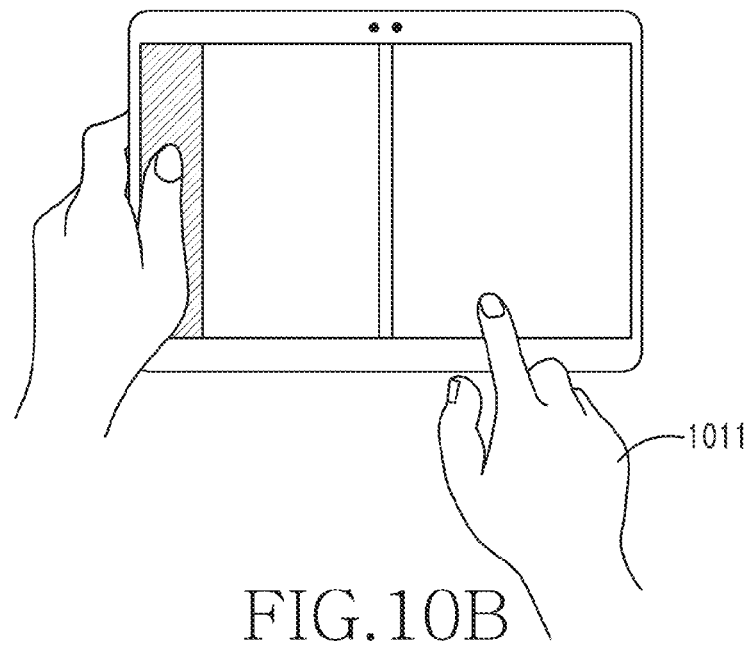
Figure 10C:
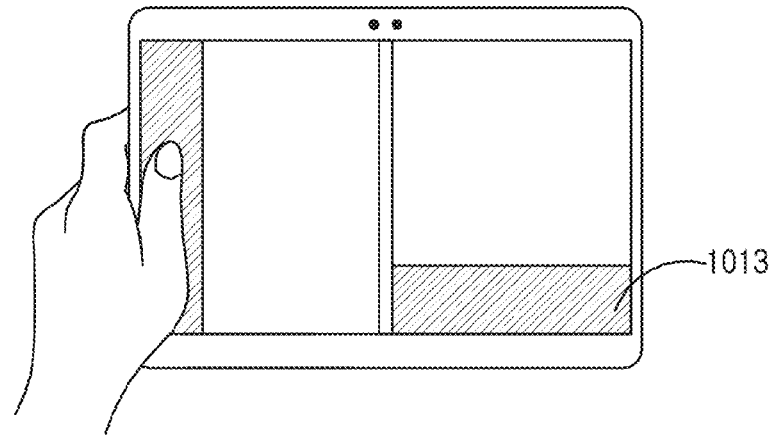

FIGS. 10A, 10B, and 10C are diagrams of the inactive area edited in the electronic device according to another embodiment of the present disclosure.

Referring to FIGS. 10A to 10C, the electronic device 1001 can designate part of the active area as the inactive area according to the user's grip.

Further, the electronic device 1001 can generate (copy) the same inactive area to a different location.

The electronic device 1001 can designate part of the active area as the inactive area by detecting the user's gesture in the active area. Such an inactive area is maintained until the event for releasing the inactive area occurs. Herein, the event for releasing the inactive area can release the gesture for setting the inactive area. Herein, the touch input for setting the inactive area can be released.

For example, the electronic device can detect the user's gesture for selecting the menu (displayed software execution menu, hardware execution menu) which releases the inactive area.

For example, the electronic device can detect the user's gesture 1009 for restoring the changed screen configuration.

When detecting a user's gesture 1009 for copying an inactive area while the user's body 1007 holds the left inactive area 1005 (for example, the touch is maintained in the active area) as shown in FIG. 10A, the inactive area is copied.

Next, when detecting a user's gesture 1011 for selecting a location to designate the same inactive area as the preset inactive area as shown in FIG. 10B, the electronic device 1001 can copy the left inactive area 1005 as the right inactive area 1013 at the location selected by the user as shown in FIG. 10C.

In so doing, the copied inactive area can maintain the characteristics of the inactive area 1005. Herein, the characteristics of the inactive area 1005 can be maintained by setting a new inactive area in the same width as the inactive area 1005. When the control menu is set and displayed in the inactive area 1005, the inactive area including the control menu can be copied to thus maintain the characteristics of the inactive area 1005.

While the inactive area is edited with the multiple execution screens 1001 and 1003 displayed in the active area in FIG. 10A, the inactive area can be edited while the active area displays a single execution screen.

Referring to FIG. 10A, the user issues the event for copying the inactive area by touching the inactive area with the other hand while still holding the electronic device 1001 via the inactive area, and then selects the location for the copied active area through consecutive touches. Various user gestures can copy the inactive area.

Figure 11A:
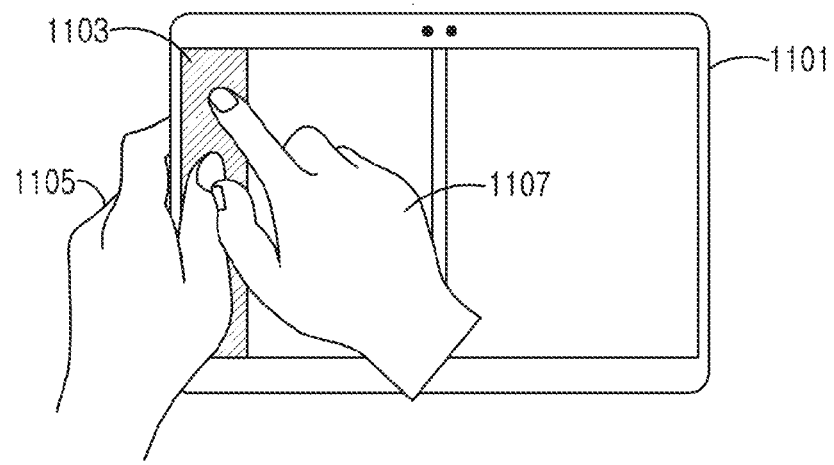
FIGS. 11A, 11B, and 11C are diagrams of an inactive area edited in an electronic device according to another embodiment of the present disclosure.
Figure 11B:
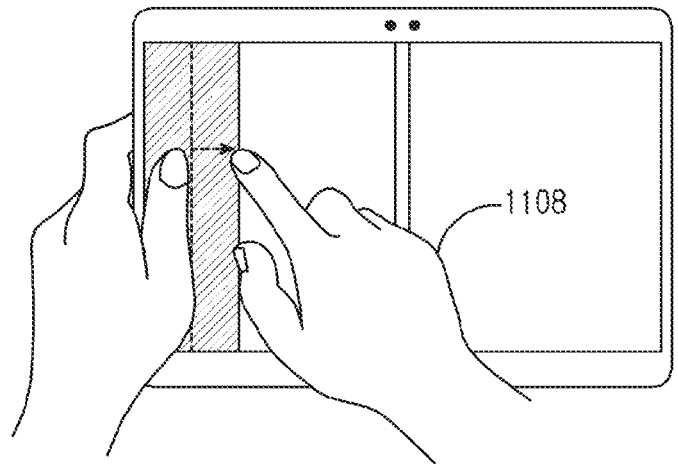
Figure 11C:
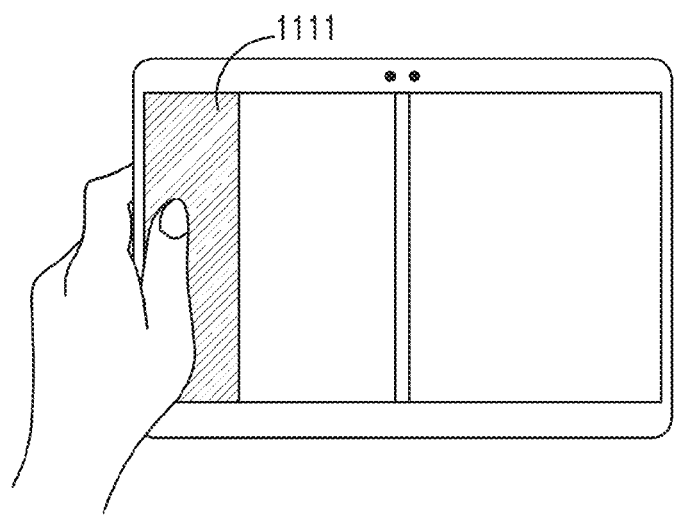

FIGS. 11A, 11B, and 11C are diagrams of the inactive area edited in the electronic device according to yet another embodiment of the present disclosure.

Referring to FIGS. 11A to 11C, the electronic device 1101 can designate part of the active area as the inactive area 1103 according to the user's grip.

Further, the electronic device 1101 can adjust the size of the inactive area 1103.

The electronic device 1101 can designate part of the active area as the inactive area 1103 by detecting the user's gesture in the active area. Such an inactive area is maintained until the event for releasing the inactive area occurs. Herein, the event for releasing the inactive area can release the gesture for setting the inactive area. Herein, the touch input for setting the inactive area can be released.

For example, the electronic device can detect the user's gesture for selecting the menu (displayed software execution menu, hardware execution menu) which releases the inactive area.

For example, the electronic device can detect the user's gesture for restoring the changed screen configuration.

When detecting a user's gesture 1107 for adjusting the size of an inactive area 1103 while the user body 1105 holds the electronic device 1101 (for example, the touch in the active area is maintained) as shown in FIG. 11A, the electronic device 1101 can adjust the size of the inactive area 1103.

Next, when detecting a user's gesture 1108 for determining a new size of the preset inactive area as shown in FIG. 11B, the electronic device 1101 can adjust the left inactive area to the new size 1111 as shown in FIG. 11C.

While the inactive area is edited with the multiple execution screens displayed in the active area in FIGS. 11A to 11C, the inactive area can be edited while the active area displays a single execution screen.

Referring to FIGS. 11A to 11C, the user issues the event for adjusting the inactive area size by touching the inactive area with the other hand while still touching the inactive area, and then increases or reduces the inactive area by moving the touch. Various user gestures can adjust the inactive area size.

Figure 12A:
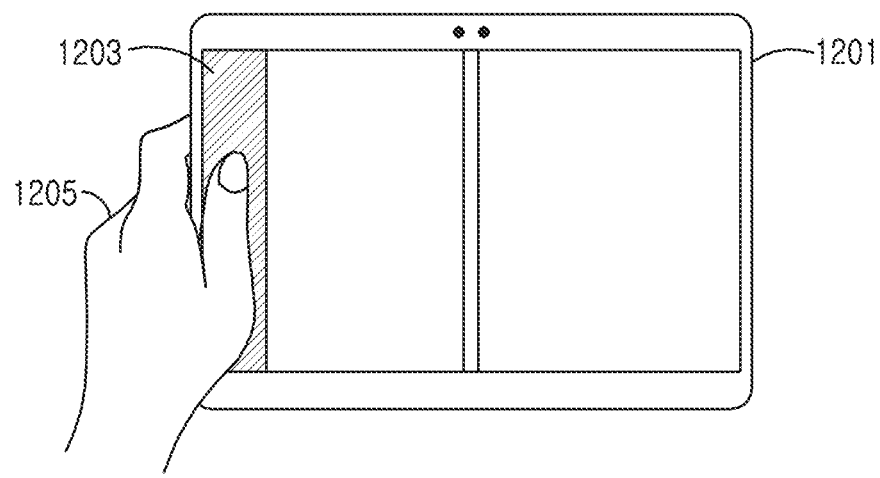
FIGS. 12A, 12B, and 12C are diagrams of an inactive area released in an electronic device according to an embodiment of the present disclosure.
Figure 12B:
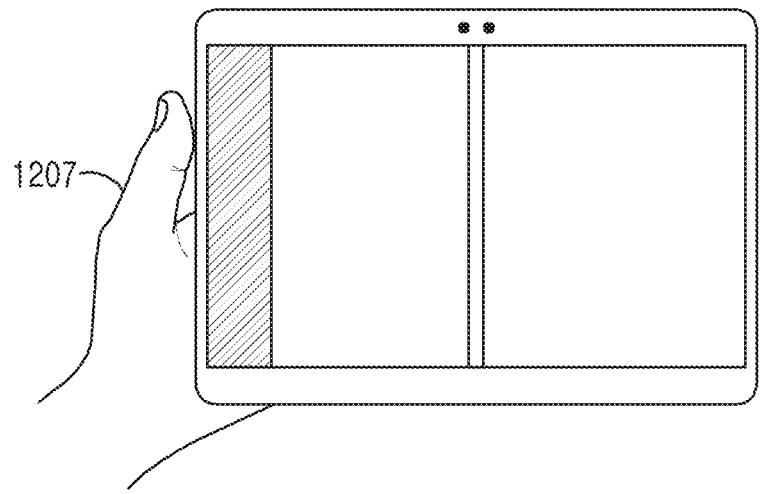
Figure 12C:
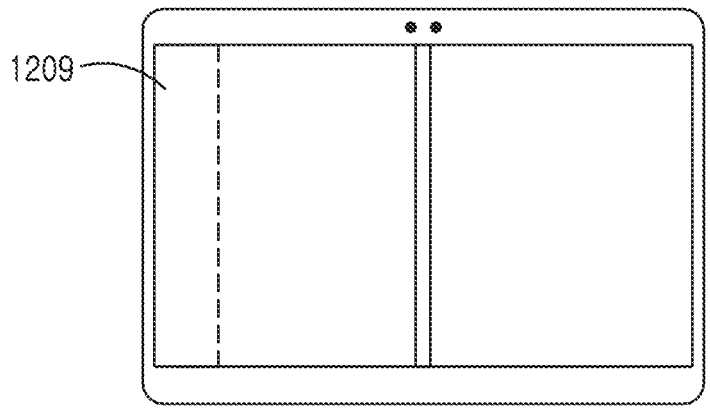

FIGS. 12A, 12B, and 12C are diagrams of the inactive area released in the electronic device according to an embodiment of the present disclosure.

Referring to FIGS. 12A to 12C, the electronic device 1201 can designate part of the active area as the inactive area according to the user's grip.

The electronic device 1201 can define the gesture detection area designated to pixels of a preset range from the rim of the active area, as the active area. Such a gesture detection area can be defined in at least one of the four sides of the active area.

For example, when detecting the gesture for keeping the touch input in the gesture detection area for a certain time, the electronic device 1201 can designate part of the active area as the inactive area.

For example, when detecting the user's gesture for moving the touch from the frame of the display to the border (end) of the gesture detection area, the electronic device 1201 can designate part of the active area as the inactive area.

For example, when detecting the user's gesture for selecting the menu (displayed software execution menu, hardware execution menu) which generates the inactive area, the electronic device 1201 can designate part of the active area as the inactive area.

When detecting the user's gesture for selecting the menu which changes the displayed screen configuration, the electronic device 1201 can designate part of the active area as the inactive area. In so doing, the menu for changing the displayed screen configuration can concurrently display the execution screens in the active area. The electronic device sets the inactive area because the screen configuration is changed and the menu for controlling the execution screen can be placed proximate to the user's finger location The electronic device 1201 can detect the user's gesture in the active area and designate part of the active area as the inactive area. Such an inactive area is maintained until the event for releasing the inactive area occurs. Herein, the event for releasing the inactive area can release the gesture for setting the inactive area. For example, the touch input for setting the inactive area can be released.

For example, the electronic device 1201 can detect the user's gesture for selecting the menu (displayed software execution menu, hardware execution menu) which releases the inactive area.

For example, the electronic device can detect the user's gesture for restoring the changed screen configuration.

When holding an left inactive area 1203 (for example, holding the touch in the inactive area) with the user's body 1205 as shown in FIG. 12A, the electronic device 1201 can detect a user's gesture 1207 for releasing an inactive area 1205 as shown in FIG. 12B and release the preset inactive area 1209 as shown in FIG. 12C.

While the inactive area is edited with the multiple execution screens displayed in the active area in FIGS. 12A to 12C, the inactive area can be edited while the active area displays a single execution screen.

FIGS. 13A, 13B, 13C, and 13D are diagrams of a screen for setting the control menu in the inactive area of the electronic device according to an embodiment of the present disclosure.

Figure 13A:
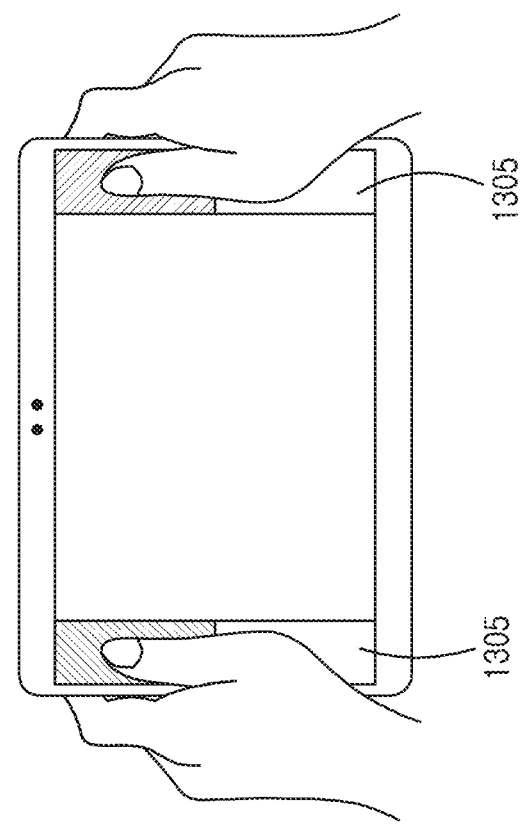
FIGS. 13A, 13B, 13C, and 13D are diagrams of a screen for setting a control menu in an inactive area of an electronic device according to an embodiment of the present disclosure.

Referring to FIG. 13A, the electronic device can designate part of the active area 1301 as the inactive area 1303 according to the user's grip. The inactive area 1303 is set on the left and the right if the user grips the left side and the right side of the electronic device.

While the inactive area 1303 blocks the input data corresponding to the user's gesture, the control menu can be set in part of the inactive area 1303 to recognize the user's gesture in the inactive area.

That is, the electronic device can set the control menu outside the active area based on the location of the detected user gesture. In so doing, the electronic device can set and display the control menu area based on the number of the control menus.

Figure 13B:
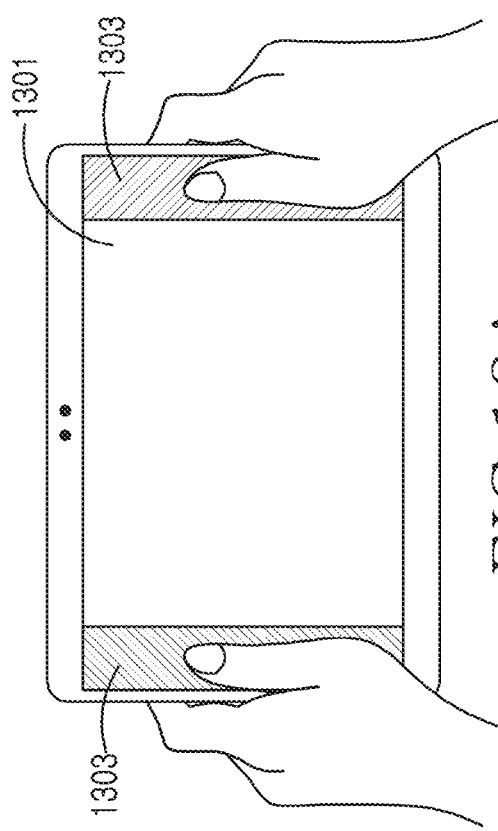

For example, the electronic device can set two control menus and set the control menus in the two inactive areas respectively as shown in FIG. 13B. The electronic device detects the user's gesture above the inactive area and sets and displays the control menu 1305 below the inactive area.

When detecting the user's gesture below the inactive area, the electronic device can set the control menu above the inactive area.

When detecting the user's gesture in the middle of the inactive area, the electronic device can divide the inactive area to the upper portion and the lower portion based on the location of the detected user gesture, and set the control menu at the location meeting a condition. Herein, the location meeting the condition can select a larger area in the upper portion and the lower portion of the inactive area that is divided based on the location of the detected gesture.

Figure 13C:
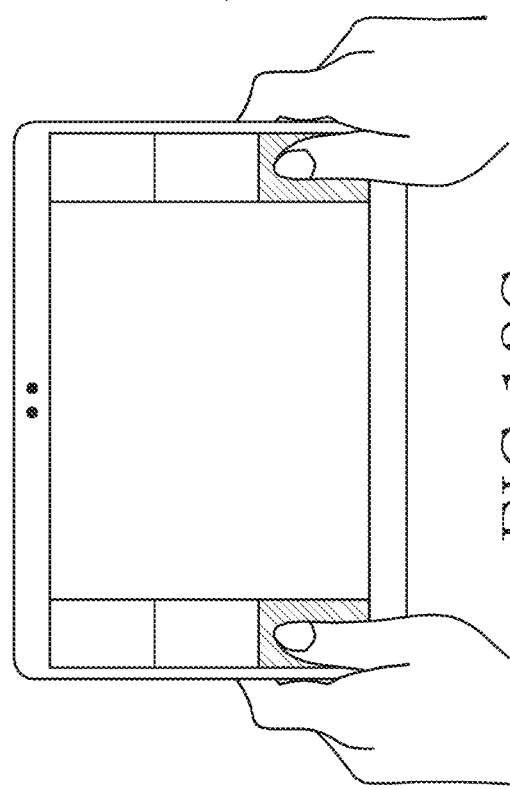

For example, when two control menus are set in the single inactive area as shown in FIG. 13C, the electronic device can identify the whole area for the control menu based on the location of the detected gesture by splitting the area based on the number of the control menus to be displayed.

That is, when the whole area for the control menu includes 800 pixels, the electronic device can set a control menu in each 400 pixel region. In so doing, the electronic device can define the control menu in the area excluding the location of the detected user. The area corresponding to the location of the detected gesture is excluded to prevent the control menu selection error caused by the unintentional movement of the user's finger.

Referring to FIG. 13C, the electronic device detects the user's gesture below the inactive area and sets the two control menus above the inactive area (shaded).

When detecting the user's gesture above the inactive area, the electronic device sets two control menus below the inactive areas.

When detecting the user's gesture in the middle of the inactive area, the electronic device can divide the inactive area to the upper portion and the lower portion based on the location of the detected user gesture and set the control menu at the location meeting the condition. Herein, the location meeting the condition can select a larger area in the upper portion and the lower portion of the inactive area that is divided based on the location of the detected gesture.

When not setting all of the control menus at the locations meeting the condition, the electronic device can set some control menus at the location meeting the condition (e.g., at the top) and the other control menus at the location not meeting the condition (e.g., at the bottom).

Figure 13D:
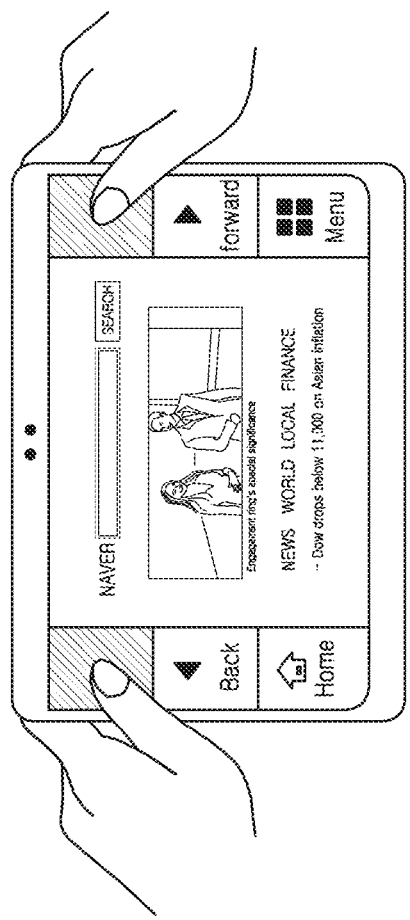

For example, when a web browser is running, the electronic device can set the control menu for controlling the web browser in part of the inactive area as shown in FIG. 13D.

That is, the electronic device can use only a particular area of the inactive area generated by the user's gesture based on the location of the detected gesture as the actual inactive area and set the menu for controlling the web browser in the remaining area. The menu in the inactive area for controlling the web browser includes a Back menu command for moving to a previous page, a Forward menu command for returning to the previous page, a Home menu command for entering a home page, and a menu command for fetching the frequently used menu commands in the browser function.

The electronic device can provide guide information of the control menu in the inactive area. The guide information, which relates to the control menu defined in the inactive area, can include graphic information such as an icon, text, and an image.

The electronic device can generate the guide information as a layer and overlay the layer with the screen showing the inactive area or, instead of the screen showing the inactive area, directly add the guide information to the control menu area.

As such, the inactive area does not recognize the user's gesture, whereas the control menu area can recognize the user's gesture.

Figure 14A:
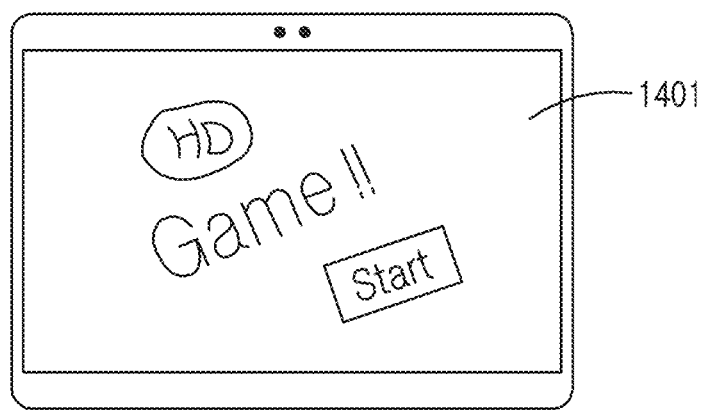
FIGS. 14A, 14B, and 14C are diagrams of an inactive area defined in an electronic device according to another embodiment of the present disclosure.
Figure 14B:
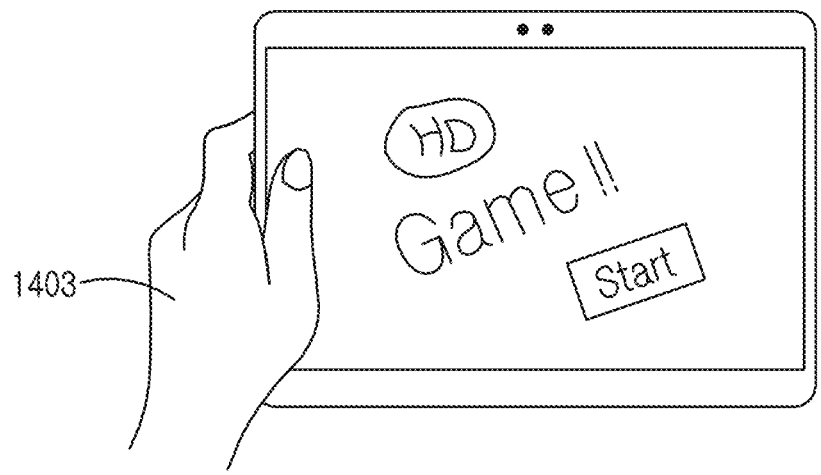
Figure 14C:
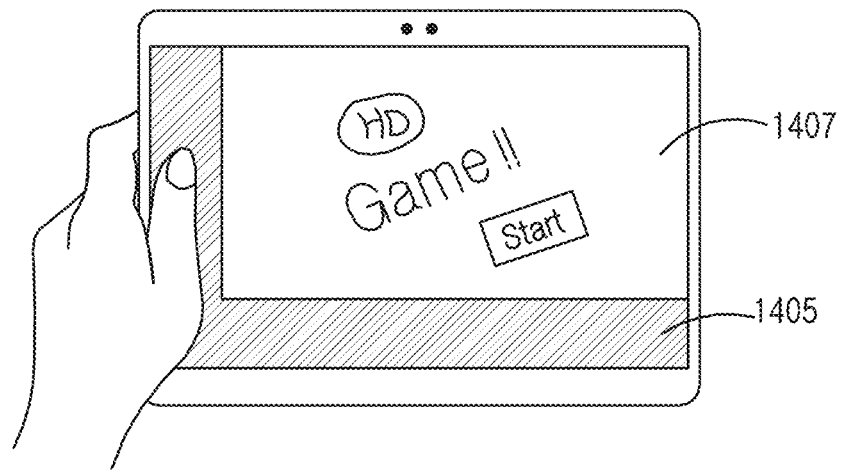

FIGS. 14A, 14B, and 14C are diagrams of the inactive area defined in the electronic device according to another embodiment of the present disclosure.

Referring to FIGS. 14A to 14C, the electronic device can designate part of the active area as the inactive area according to the type of the running application.

That is, to execute the application that sustains a specific resolution such as a game or a video, the electronic device can scale the execution screen to sustain the aspect ratio based on the location of the detected user gesture and designate the remaining area as the inactive area.

For example, the electronic device can run the application 1401 retaining the resolution 1280*720 as shown in FIG. 14A.

When the user's body 1403 grips the left portion of the electronic device as shown in FIG. 14B, the electronic device designates the left portion of the active area as the inactive area.

In this case, only the width of the active area is changed and accordingly the original aspect ratio is not maintained.

To retain the original aspect ratio 1407, the electronic device can designate the inactive area 1405 along the vertical axis and the horizontal axis as shown in FIG. 14C.

Figure 15A:
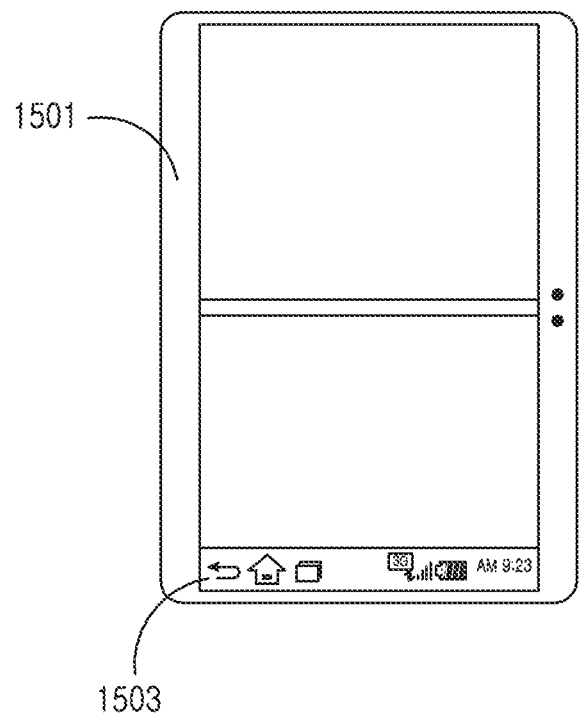
FIGS. 15A and 15B are diagrams of an inactive area defined in an electronic device according to yet another embodiment of the present disclosure.
Figure 15B:
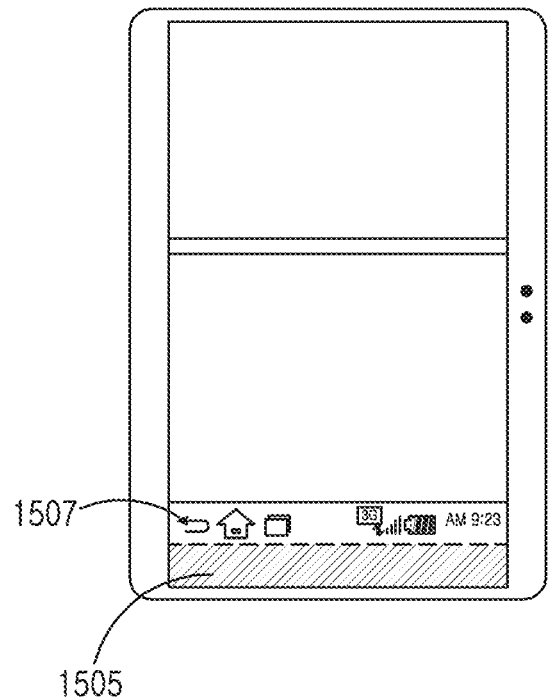

FIGS. 15A and 15B are diagrams of the inactive area defined in the electronic device according to yet another embodiment of the present disclosure.

Referring to FIG. 15A, the electronic device 1501 can display at least one execution screen. Herein, displaying the execution screen indicates that the application execution screen is displayed.

The execution screen includes the menu for controlling the execution screen and an area 1503 for displaying the status information of the electronic device, mostly below the execution screen.

Recent electronic devices with the improved multimedia function can serve as not only a portable terminal but also a Personal Computer (PC) at home or an office.

For example, the user in the supine position may browse the web or view a video using the electronic device. Due to the weight of the electronic device, the electronic device can closely contact the user's body.

In this case, the menu below the execution screen may be blocked and cannot be viewed by the user.

To address such a drawback, when the menu is not visible, the electronic device can designate the area that is not visible as an inactive area 1505 as shown in FIG. 15B, thereby causing the menu 1507 to be visible.

In so doing, the electronic device can determine the close contact to the user's body using a sensor.

Figure 16A:
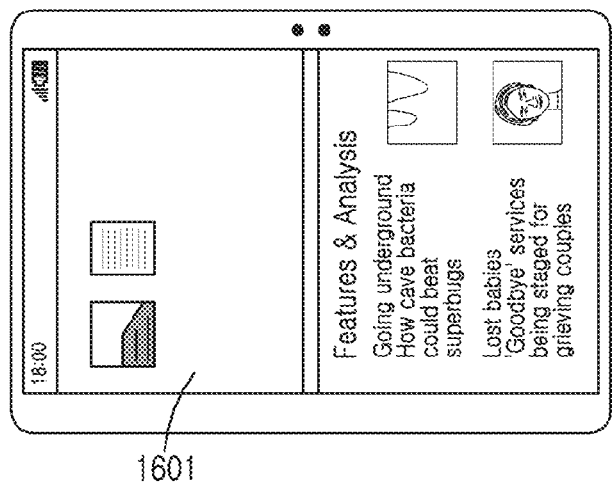
FIGS. 16A, 16B, and 16C are diagrams of an inactive area moved in an electronic device according to an embodiment of the present disclosure.
Figure 16B:
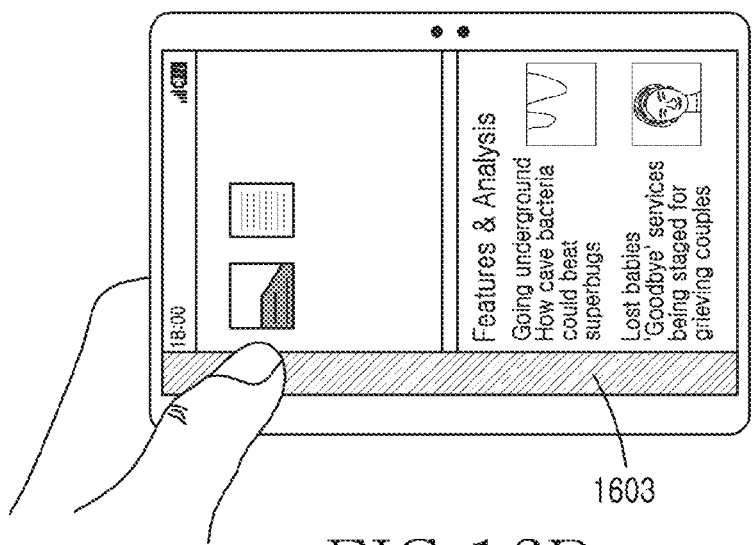
Figure 16C:
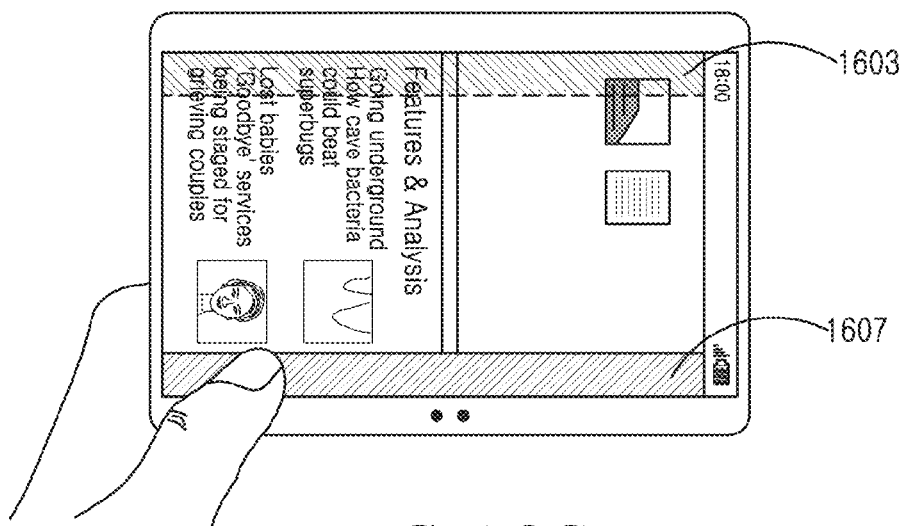

FIGS. 16A, 16B, and 16C are diagrams of the inactive area moved in the electronic device according to an embodiment of the present disclosure.

Referring to FIGS. 16A to 16C, when the electronic device rotates and the preset inactive area also rotates, the electronic device can move the rotated inactive area to the original location.

That is, the electronic device can display the application execution screen in an active area 1601 as shown in FIG. 16A.

When the user grips the electronic device as shown in FIG. 16B, part of the finger is placed in the active area 1601. The finger in the active area can cover part of the execution screen displayed in the active area, which requests to designate the inactive area in the active area.

Accordingly, the electronic device designates part of the active area as the inactive area 1603 as illustrated in FIG. 16B.

When the user rotates the electronic device, the inactive area 1603 below the active area 1601 also rotates. For example, the user is lying down and grips the electronic device by the lower portion of the electronic device with one hand. When the user changes position and rotates the electronic device 180 degrees, the inactive area also rotates 180 degrees and the inactive area at the bottom moves to the top.

In this case, the electronic device can detect the motion change using a gyro sensor or an accelerometer. Based on the motion change and the user's grip, the electronic device can automatically move the inactive area 1603 at the top to the bottom 1607 of the preset inactive area as shown in FIG. 16C.

The method for adjusting the display area in the electronic device can include, when detecting a gesture for setting an inactive area in an active area, identifying a size and a location of a virtual inactive area to set and designating part of the active area as the inactive area based on the identified size and location of the virtual inactive area.

The gesture for setting the inactive area can include at least one of a touch movement gesture of a certain distance from a display boundary, a gesture for selecting a menu to generate a virtual bezel, a gesture for selecting a menu to change screen configuration, and a gesture for grabbing the electronic device and maintaining a touch input.

The method can include, when detecting a gesture for requesting to release the inactive area, restoring a preset inactive area to the active area.

The identifying of the size and the location of the virtual inactive area can include, when a plurality of execution screens is displayed and a gesture is detected, identifying the size and the location of the virtual inactive area in a display area of the detected gesture among split display areas.

The identifying of the size and the location of the virtual inactive area can include, when detecting a gesture during application execution requiring an aspect ratio, determining the size and the location of the virtual inactive area according to the aspect ratio of the execution screen.

The designating of part of the active area to the inactive area can include setting a control menu of an execution screen in a preset area of the inactive area.

The method for adjusting the display area in the electronic device can include, after setting the inactive area, when detecting a user gesture in the inactive area, blocking input data of the gesture, and when a control menu is set in the inactive area of the detected user gesture, generating input data corresponding to the control menu.

The method for adjusting the display area in the electronic device can include editing the set inactive area according to a user gesture. For example, the editing of the inactive area can include at least one of a size adjustment, a location change, and a copy of the inactive area.

The aforementioned components of the electronic device each can include one or more components, and the names of the corresponding components can differ according to the type of the electronic device. The present electronic device can include at least one of the components, omit some components, or further include other components. Some of the components can be integrated into a single entity to carry out the same functions of the corresponding components.

The components, for example, a module can indicate a unit including a combination of one or more of, for example, hardware, software, and firmware. The module can be interchangeably used with, for example, a unit, logic, a logical block, a component, or a circuit. The module can be a minimum unit or part of the component integrally formed. The module may be a minimum unit or part for one or more functions. The module can be implemented mechanically or electronically. For example, the module can include at least one of an Application Specific Integrated Circuit (ASIC) chip, Field Programmable Gate Arrays (FPGAs), and a programmable-logic device for particular operations.

At least part of the apparatus (e.g., modules or functions) or the method of the present disclosure can be implemented as, for example, instructions stored in a non-transitory computer-readable storage medium. When one or more processors execute the instructions, the processor can perform the function corresponding to the instructions. The non-transitory computer-readable storage medium can include, for example, a memory. At least part of the programming module can be realized (e.g., executed) by, for example, the processor. At least part of the programming module can include, for example, a module, a program, a routine, sets of instructions, or a process for one or more functions.

The non-transitory computer-readable storage medium includes, for example, magnetic media such as a hard disk, a floppy disk, a magnetic tape, optical media such as Compact Disc Read Only Memory (CD-ROM) and Digital Versatile Disc (DVD), magneto-optical media such as floptical disk, and hardware devices specifically configured to store and execute the program instructions (e.g., the programming modules) such as a Read Only Memory (ROM), a Random Access Memory (RAM), and a flash memory. The program instruction can include not only a machine code made by a complier but also a high-level language code executable by a computer using an interpreter. The hardware device can serve as one or more software modules for fulfilling the operations of the present disclosure, and vice versa.

The module or the programming module can include at least one of the components, omit some components, or further include other components. The operations to be conducted by the modules, the programming modules, or other components can be carried out in sequence, in parallel, repeatedly, or heuristically. Some operations can be executed in a different order, omitted, or added with other operations.

The instructions stored in the storage medium controls the at least one processor to perform at least one operation. The at least one operation can include, when detecting a gesture for setting an inactive area in an active area of a display, identifying a size and a location of a virtual inactive area to set, and designating part of the active area as the inactive area based on the identified size and location of the virtual inactive area.

As set forth above, the method and the apparatus for dynamically setting the inactive area of the display prevents unnecessary input from the user's hand gripping the electronic device by designating part of the active area as the inactive area according to the user's grip.

In addition, the electronic device sets and displays the menu for controlling the display screen in the virtual inactive area so as to easily control the display screen when grabbed by the user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   detecting a gesture for setting an inactive area in an active area of a display;
   identifying a size and a location of the inactive area to set;
   designating part of the active area as the inactive area based on the identified size and location of the inactive area;
   releasing at least a part of the inactive area to an active area for displaying a control menu associated with an application executed in the active area; and
   in response to an input into the control menu, executing a command in the application.

2. The method of claim 1, wherein the gesture for setting the inactive area comprises at least one of a touch input within a distance from a display boundary, a touch input of selecting a menu to generate a virtual bezel, a touch input of selecting a menu to change screen configuration, and a touch input of gripping the electronic device and maintaining the touch input.

3. The method of claim 1, further comprising:
   when detecting a gesture for requesting to release the inactive area, restoring the inactive area to the active area.

4. The method of claim 1, wherein the identifying of the size and the location of the inactive area comprises:
   when a plurality of execution screens is displayed and the gesture for setting an inactive area is detected, identifying the size and the location of the inactive area in a display area of the detected gesture among split display areas.

5. The method of claim 1, wherein the identifying of the size and the location of the inactive area comprises:
   when detecting the gesture for setting an inactive area during execution of an application that requires an aspect ratio, determining the size and the location of the inactive area according to the aspect ratio of the application.

6. The method of claim 1, further comprising:
   when detecting a user gesture in the inactive area and a control menu is not set in the inactive area, blocking input data of the detected user gesture.

7. The method of claim 1, further comprising:
   editing the inactive area according to a user gesture,
   wherein the editing of the inactive area comprises at least one of a size adjustment, a location change, and a copy of the inactive area.

8. An electronic device for adjusting a display area, the electronic device comprising:
   at least one processor;
   a memory; and
   at least one program stored in the memory and configured for execution by the at least one processor,
   wherein the program comprises an instruction for:
      when touch input maintained in an active area of a display is detected, designating part of the active area as the inactive area if the part of the active area satisfies a condition,
      releasing at least a part of the inactive area to an active area for displaying a control menu associated with an application executed in the active area, and
      in response to an input into the control menu, executing a command in the application,
   wherein the gesture comprises at least one of a touch movement of a distance from a display boundary, a menu selection to generate a virtual bezel, and a menu selection to change screen configuration.

9. The electronic device of claim 8, wherein the program further comprises an instruction for, when detecting a gesture for requesting to release the inactive area, restoring the inactive area to the active area.

10. The electronic device of claim 8, wherein the program further comprises an instruction for, when a plurality of execution screens is displayed and a gesture is detected, determining a size and a location of the inactive area in a display area.

11. The electronic device of claim 8, wherein the program further comprises an instruction for, when detecting a gesture during application execution requiring an aspect ratio, determining a size and a location of the inactive area according to the aspect ratio of the execution screen.

12. The electronic device of claim 8, wherein the program further comprises an instruction for, after setting the inactive area, when detecting a user gesture in the inactive area, blocking input data of the gesture and, when a control menu is set in the inactive area of the detected user gesture, generating input data corresponding to the control menu.

13. The electronic device of claim 8, wherein the program further comprises an instruction for editing the inactive area according to a user gesture, and
   wherein the editing of the inactive area comprises at least one of a size adjustment, a location change, and a copy of the inactive area.

14. The electronic device of claim 8, wherein the program further comprises an instruction for, when a location of a preset inactive area is changed according to rotation of the electronic device, processing to change a location of the change inactive area.

15. The electronic device of claim 8, wherein the program further comprises an instruction for adding guide information of the control menu to a control menu area.

16. The electronic device of claim 15, wherein the program further comprises an instruction for processing to identify a direction of the detected user gesture after the electronic device is rotated, and to change the changed inactive area location to the direction of the detected gesture according to the rotation of the electronic device.

17. A non-transitory computer-readable storage medium storing one or more programs for:
   when detecting a gesture for setting an inactive area in an active area of a display, identifying a size and a location of the inactive area to set;
   designating part of the active area as the inactive area based on the identified size and location of the inactive area;
   releasing at least a part of the inactive area to an active area for displaying a control menu associated with an application executed in the active area; and
   in response to an input into the control menu, executing a command in the application.

* * * * *